US010516701B2

(12) United States Patent
Boyadjiev et al.

(10) Patent No.: US 10,516,701 B2
(45) Date of Patent: Dec. 24, 2019

(54) NATURAL LANGUAGE PROCESSING ARTIFICIAL INTELLIGENCE NETWORK AND DATA SECURITY SYSTEM

(71) Applicants: ACCENTURE GLOBAL SOLUTIONS LIMITED, Dublin (IE); MISRAM LLC, Holmdel, NJ (US)

(72) Inventors: Constantine T. Boyadjiev, Jersey City, NJ (US); Rajarathnam Chandramouli, Holmdel, NJ (US); Zongru Shao, Jersey City, NJ (US); Koduvayur Subbalakshmi, Holmdel, NJ (US)

(73) Assignees: ACCENTURE GLOBAL SOLUTIONS LIMITED, Dublin (IE); MISRAM LLC, Holmdel, NJ (US)

( * ) Notice: Subject to any disclaimer, the term of this patent is extended or adjusted under 35 U.S.C. 154(b) by 181 days.

(21) Appl. No.: 15/726,137

(22) Filed: Oct. 5, 2017

(65) Prior Publication Data
US 2019/0109878 A1    Apr. 11, 2019

(51) Int. Cl.
*G06F 7/04* (2006.01)
*H04L 29/06* (2006.01)
(Continued)

(52) U.S. Cl.
CPC ........ *H04L 63/205* (2013.01); *G06F 17/2785* (2013.01); *G06F 17/28* (2013.01);
(Continued)

(58) Field of Classification Search
CPC ............. G06F 17/2785; G06F 2216/03; G06F 16/9535; G06F 17/30867; H04L 63/0281; H04L 63/0884; H04L 63/105
See application file for complete search history.

(56) References Cited

U.S. PATENT DOCUMENTS 9,253,148 B2   2/2016  Zampiello
9,516,280 B1  12/2016  Renkis
(Continued)

OTHER PUBLICATIONS

Strapparava, et al., "Learning to Identify Emotions in Text", ACM 2008, 5 pages.
(Continued)

*Primary Examiner* — Olugbenga O Idowu
(74) *Attorney, Agent, or Firm* — Mannava & Kang, P.C.

(57) ABSTRACT

According to an embodiment, a natural language processing artificial intelligence network and data security system determines an emotions model for one or more users from electronic natural language interactions of the users. The system includes a natural language processing decoder to determine textual features from the electronic natural language interactions that may be indicative of emotional states of the users. They system includes an emotions model encoder that generates an emotions model based on the emotional states of the users in the electronic natural language interactions retrieved from the data storage. The system also includes an artificial intelligence network and data security subsystem. The artificial intelligence network and data security subsystem may use the emotions model as a primitive for artificial intelligence based tasks including computer system security, network security, data security, proactive monitoring and preventive actions, that are moderated using the context provided by the emotional state of a user.

20 Claims, 17 Drawing Sheets

(51) Int. Cl.
*H04L 12/58* (2006.01)
*G06F 17/27* (2006.01)
*G06F 21/50* (2013.01)
*G06N 5/02* (2006.01)
*G06N 7/00* (2006.01)
*G06F 17/28* (2006.01)
*G06F 21/60* (2013.01)
*G06N 3/04* (2006.01)
*G06N 20/00* (2019.01)
*G06F 7/02* (2006.01)
*G06N 5/04* (2006.01)
*G06Q 10/06* (2012.01)

(52) U.S. Cl.
CPC ............ *G06F 21/50* (2013.01); *G06F 21/604* (2013.01); *G06N 5/022* (2013.01); *G06N 7/005* (2013.01); *H04L 51/12* (2013.01); *H04L 63/102* (2013.01); *G06F 7/023* (2013.01); *G06N 3/0454* (2013.01); *G06N 5/04* (2013.01); *G06N 20/00* (2019.01); *G06Q 10/06398* (2013.01)

(56) References Cited

U.S. PATENT DOCUMENTS

| | | | |
|---|---|---|---|
| 9,569,729 B1 | 2/2017 | Oehrle et al. | |
| 10,069,842 B1* | 9/2018 | Bradley | G06F 17/2785 |
| 2014/0095150 A1* | 4/2014 | Berjikly | G06F 17/2785 |
| | | | 704/9 |
| 2015/0213002 A1 | 7/2015 | Liang et al. | |
| 2015/0256675 A1 | 9/2015 | Mathangi et al. | |
| 2016/0330217 A1* | 11/2016 | Gates | H04L 63/1416 |

OTHER PUBLICATIONS

Strapparava, et al., "SemEval-2007 Task 14: Affective Text", 2007, 5 pages.

Colley, "Colley's Bias Free College Football Ranking Method: The Colley Matrix Explained", Princeton University, 2002, 23 pages.

Ekman, "Are There Basic Emotions?", Psychological Review, 1992, vol. 99, No. 3, pp. 550-553.

Han, et al., "Analyticity of Entropy Rate of Hidden Markov Chains", Aug. 19, 2006, 32 pages.

* cited by examiner (e) Distribution of six cognitive processes (f) Daily prime cognitive processes labeled

DISTRIBUTION OF BASIC-EMOTION RUNNING TIMES IN EMAILS.

DISTRIBUTION OF COGNITIVE-PROCESS RUNNING TIMES IN EMAILS.

DISTRIBUTION OF BASIC-EMOTION RUNNING TIMES IN EMAILS.

DISTRIBUTION OF COGNITIVE-PROCESS RUNNING TIMES IN EMAILS.

US 10,516,701 B2

NATURAL LANGUAGE PROCESSING ARTIFICIAL INTELLIGENCE NETWORK AND DATA SECURITY SYSTEM

BACKGROUND

Natural language processing allows computers to process interactions between users to identify some primitives of language. Natural language processing uses grammatical rules or other analysis such as morphemic, syntactic and semantic analysis to define the true meaning of a sentence or a phrase. However, security systems in existence today generally do not use the primitives of language obtained using morphemic, syntactic and semantic analysis to enable effective monitoring and protection of networks and data from threats, such as errant employees. Errant employees may subvert the policies of the enterprise using the access they are granted for their normal work duties to perform subversive activities. For security systems and managers monitoring the employees, actions of the errant employee are often indistinguishable from the actions of an employee performing their job. A security system may monitor interactions such as emails but may not detect subversive activities unless blatantly discussed in the emails. Even manual analysis of the interactions is unlikely to detect such subversive activities. This obstacle is made even more difficult because interactions over computer networks are missing physical behavioral clues. For example, emotional state of users is extremely difficult to detect from emails, and as a result, it can be difficult for managers to identify errant employees or users. Also, employees engaged in subversive activities may be careful to hide their tracks in any interactions such as email and other documents they exchange. Using standard network security policies may not detect the subversive activities.

BRIEF DESCRIPTION OF DRAWINGS

The embodiments are described in detail in the following description with reference to the following figures. The figures illustrate examples of the embodiments.

DETAILED DESCRIPTION OF EMBODIMENTS

Figure 1A:
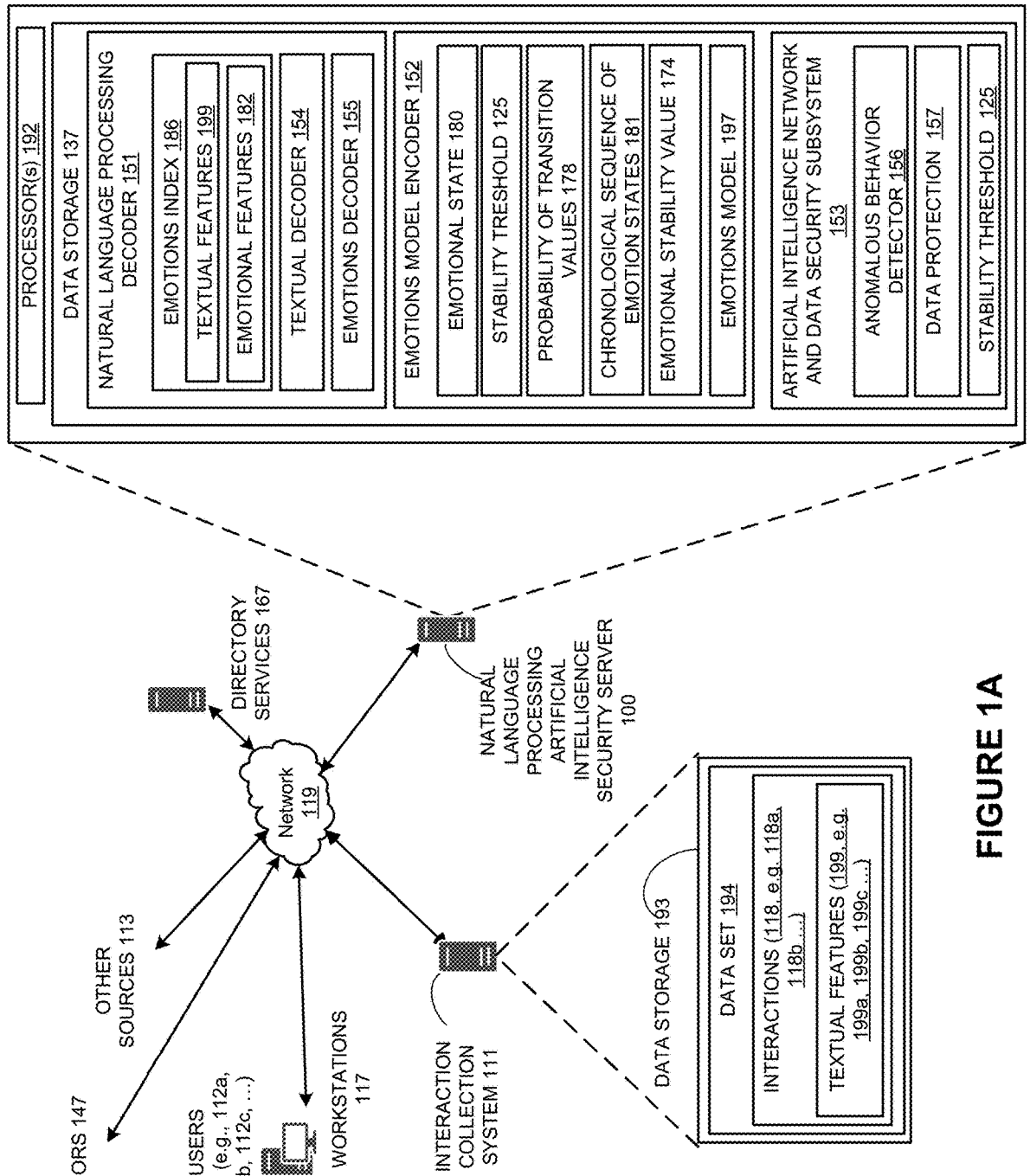
FIG. 1A illustrates an natural language processing artificial intelligence network and data security system, according to an embodiment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Furthermore, the embodiments may be used together in various combinations.

According to an embodiment, a natural language processing artificial intelligence network and data security system, hereinafter system, determines an emotions model for one or more users from electronic natural language interactions of the users. The system includes a natural language processing decoder to determine textual features from the electronic natural language interactions that may be indicative of emotional states of the users. Examples of the electronic natural language interactions, also referred to simply as interactions, may include an interaction between two or more users. The interactions may be embodied in emails, documents, natural speech such as recorded audios, recorded videos, recorded videos containing natural speech and non-verbal communication, images, text messages, social media messages or posts, etc. The interactions may be over a period of time such as a day, a few minutes or a few hours. An interaction collection system may collect and store the electronic natural language interactions in a data storage for the natural language processing decoder. The system may use the stored interactions as a dataset.

The system includes an emotions model encoder. The emotions model encoder generates an emotions model based on the emotional states of the users in the electronic natural language interactions. In examples, the emotions model encoder may retrieve the natural language interactions from the data storage. The system may also include an artificial intelligence network and data security subsystem. The artificial intelligence network and data security subsystem may use the emotions model as a primitive for artificial intelligence based tasks such as network security, data security, proactive monitoring and preventive actions. The artificial network and data security system may moderate the tasks using the context provided by the emotional state of a user. The artificial intelligence network and data security subsystem may include an anomalous behavior detector. The anomalous behavior detector may use the emotions models for the users to perceive the natural language interactions and detect anomalous behavior. The artificial intelligence network and data security subsystem may implement preventive measures when anomalous behavior is detected.

They emotions model encoder may determine an emotions model for each user based on types of emotions detected in the electronic natural language interactions. Examples of types of emotions detected may include a count of emotions in the interactions, frequency of the emotions in the interactions, hedonicity of the emotions in the interactions and frequency of transition of the emotions in the interactions. The artificial intelligence network and data security subsystem may determine anomalous behavior of a user based on an emotional stability value of the user. In examples, the artificial intelligence network and data security subsystem may compare the emotional stability value of the user with a threshold stability value. The emotional stability value may be determined based on the emotions model for the user. In an example, the threshold stability value may be based on the average stability values of users in the dataset. When the emotional stability value is within a threshold stability value, such as below the threshold stability value, the system may restrict access to data for the user. In another example, the system may activate a camera to monitor the emotional state of the user. Thus, the system is able to detect emotions expressed by the users in the dataset and act based on the detected emotions.

The artificial intelligence primitives for a user may include the emotions model for a user such as a Markov emotions model. The artificial intelligence network and data security subsystem may use the emotions model to determine the emotional stability of a user. To generate the emotions model, such as a Markov model, a natural language processing decoder may determine textual features in each of the interactions in the dataset. A textual feature may be a clause, a phrase, a sentence, or the like. In an example, a textual feature may be a sentence in an email. Also, the natural language processing decoder may determine emotional features that correspond to the textual features in the electronic natural language interactions using an emotions index. The emotional features expressed in electronic natural language interactions may be classified into types such as emotions or cognitive processes behind emotions. In an example, the emotional features expressed in the electronic natural language interactions may be the emotions categorized into positivity, anger, anxiety and sadness. In another example, the emotional features expressed in the electronic natural language interactions may be cognitive processes behind emotions such as certainty, tentativeness, discrepancy, causation, differentiation, and insight.

The emotions index may be a dictionary of a plurality of textual features in natural language interactions mapped to corresponding emotional features. For example, the emotions index may map textual features such as words in a dictionary to emotional features such as positivity, anger, anxiety and sadness. In an example, the emotions index may contain emotions mapped to the textual features. The emotions may describe emotional features such as positivity, anger, anxiety and sadness. In another example, the emotions index may contain cognitive processes underlying the emotion mapped to the textual features. The cognitive processes underlying the emotion may include certainty, tentative, discrepancy, causation, differentiation, and insight. In other examples the emotions index, may be based on vector space representations that map textual features to emotional features used in computational neural networks. Examples of vector space representations may include word2vec, doc2vec, Global Vectors for Word Representation, Bayesian Neural Word Embeddings and the like. The vector space representations of the emotions index may co-locate the emotional features and textual features in vector space. The natural language processing decoder may use the vector space representations to decode the emotions expressed in an electronic natural language interaction.

Also, the emotions index may contain a hedonicity value for each emotional feature and map words in the dictionary to emotional features and hedonicity values. The hedonicity values may describe the intensity of the emotional features in a textual feature. For example, the natural language processing decoder may use the hedonicity values from the emotions index associated with the textual features that include the words terrific, joy and glad into one emotional feature with varying intensity. The emotional intensity in the textual feature that includes the word terrific may be higher than the intensity of synonymous textual features that include the word joy and glad. Joy and glad are progressively weaker in hedonicity.

The natural language processing decoder may determine an emotional state that predominates for each interaction. In examples, the natural language processing decoder may determine the predominant emotional state for each interaction based on an aggregation of the emotions in each interaction. An emotional state that's dominant in an interaction for a user may be the emotion repeated in many textual features in the interaction, an emotion with a higher hedonicity, etc. For example, assume the interaction of the user is as follows: "Wow—you are really busy if your lunch calendar is booked for the remainder of the month! Lunch sounds good. I sure hope we make good use of the bad news about skilling's resignation and do some housecleaning can we write down some problem assets and unwind raptor?" The natural language processing decoder may determine, the word "good" in the second sentence as one count of emotional feature of the type positivity. The natural language processing decoder may determine the textual features (e.g., sentences) contain the following words expressing emotions: "hope," "good" and "resignation." The natural language processing decoder may determine the emotions in the textual feature, (i.e., third sentence) may correspond to two counts of emotional feature of the type positivity and one count of emotional feature of the type sadness. The natural language processing decoder may determine the emotional state dominant in the natural language interaction as positivity based on an aggregation of the emotions expressed in the natural language interaction. In another example, the natural language processing artificial intelligence network and data security system may normalize each emotional feature of the natural language interaction to determine the dominant emotional state of the interaction.

The emotions model encoder may determine a chronological sequence of emotional states of each of the interactions for the user. The emotions model encoder may use the time of each interaction to determine the sequence of emotional states for the interactions for the user. The emotional states expressed in the interactions correlates to the emotional states for the user. In an example, assume the interaction is an email. The emotions model encoder may determine the time of interaction based on the time the email was sent out. In another example, assume the interaction is a document. The emotions model encoder may determine the time of interaction based on the time parameters of the document such as time of creation of the document, time of modification of the document, etc. In an example, the emotions model encoder may use the emotional states of interactions from other sources such as social media to supplement the chronological sequence of emotional states.

The emotions model encoder may determine a probability of transitioning between two emotional states in the chronological sequence of emotional states for the user. In an example, the probability of transitioning between two emotional states may be an aggregation of transitions between the emotional states to another. The emotions model encoder may determine a matrix containing the probability of transitioning.

The emotions model encoder may determine an emotions model based on the probability of transitioning between different emotional states for the user during natural language interactions. In an example, the emotions model may be based on the Markov chain and may describe a stochastic process, where the transition between the current emotional state and the next emotional state during natural language interactions is independent of the previous state. The emotions model based on the Markov chain may be described as Markov emotions model. The emotions model encoder may use the specific probability of each transition or non-transition during natural language interactions in the chronological chain of emotional states to determine the emotions model. The artificial intelligence network and data security subsystem may use the emotions model to determine the frequency of change in emotional states, the count of consecutive repeated emotional states, entropy of the emotional state etc.

In another example, the artificial intelligence network and data security subsystem may determine the frequency of change in emotional states, the count of consecutive emotional states and the like, based on the chronological sequence of emotional states.

The artificial intelligence network and data security subsystem may use an emotion burst to determine the emotional stability of the user using the emotions model. In an example, an emotion burst may be a count of consecutive non-transitions of emotional states in a stochastic process. In an example, the stochastic process may describe the chronological sequence of emotional states of the user in a series of natural language interactions. In other words, emotion burst may be described as a continuous run of emotions in a series of natural language interactions of a user. In another example, the artificial intelligence network and data security subsystem may use the inverse of an emotion burst, i.e., a count of consecutive transitions of emotional states of a user in a series of natural language interactions to determine the emotional stability of the user. In another example, the natural language processing artificial intelligence network and data security system may determine the entropy value of the emotions model to determine the emotional stability value of the user in a series of natural language interactions. The artificial intelligence network and data security subsystem may determine an entropy rate of the emotions model. The entropy rate of the emotions model may be a time density of emotional states in the chronological sequence of emotional states for the user.

The artificial intelligence network and data security subsystem may determine a relative ranking between the users in the dataset based on the chronological sequence of emotional states or based on the entropy value of the emotions model. The artificial intelligence network and data security subsystem may determine a win-loss table of interactions between sub-sets of two users during the same period of time for each of the users using a Colley's rating. In an example, the artificial intelligence network and data security subsystem may determine a Colley's rating for each interaction between sub-sets of users. Examples of natural language interactions between a subset of two users that the artificial intelligence network and data security subsystem may use to calculate the Colley's rating includes interactions between a first user and a second user, interactions between the first user and a different user, interactions between the second user and an another user, and the like. For example, assume the interactions are emails. The interactions may include an email from the first user and a reply to the email from the second user, emails from the first user to a third user during a period of time, and an email from the second user to a fourth user during the same period of time, etc.

A technical problem associated with artificial intelligence and natural language decoders is how to detect anomalous behavior from a dataset of natural language interactions, and how to compare the emotional states of the user natural language interactions present in a dataset. The emotional states can vary for the same user at different points in time, can vary between different users facing the same stress differently, can vary based on the intensity of the emotions, and the like. The emotions model encoder, according to an embodiment, may create an emotions model for each user to allow artificial intelligence subsystems to compare emotional states of a user to other users. Another technical problem for artificial intelligence subsystems and natural language decoders is how to detect anomalous behavior of a user based on electronic natural language interactions that may not provide behavioral clues, such as facial expressions and body language. Similarly, the users may mask emotions in natural language interactions, when the users are subverting the policies of the enterprise for personal gains. The artificial intelligence network and data security subsystem, according to an embodiment, may detect subtle emotional differences that otherwise may not be discernable. For example, the artificial intelligence network and data security subsystem according to an embodiment may determine heightened emotions in interactions involving co-conspirators. In another example, the artificial intelligence network and data security subsystem according to an embodiment may determine the entropy value of a user is lower than entropy values of other normal users. Thus, the artificial intelligence network and data security subsystem according an embodiment advances the field of computing and enables the natural language processing artificial intelligence network and data security system to create an emotions model of the user, and use the model to perceive anomalous behavior. The artificial intelligence network and data security subsystem also advances the field of emotions analysis and enables accurate detection of emotional states of the user non-intrusively.

FIG. 1A shows an natural language processing artificial intelligence network and data security system 100, according to an embodiment. The natural language processing artificial intelligence network and data security system 100 may be connected to one or more of workstations 117 of users 112, interaction collection system 111, sensors 147 and other sources 113 via network 119. In an example, the users 112 may include employees of an enterprise and others users the employees interact with such as customers of the enterprise, social media users and the like. The workstations 117 may include laptops, desktop computers, thin-clients, virtual machines, virtual machines running on terminal servers, mobile devices that may be used by users 112 such as employees to access data. In examples, the workstations 117 may be physically located on the premises of the enterprise. In other examples, the workstations 117 may be remotely connected to the enterprise through the network 119. The workstations 117 may be managed by a directory services 167 system that may perform authentication, directory, policy, and other services. The sensors 147 may include biometric sensors, smart card readers, Radio Frequency Identification sensors, Bluetooth sensors, proximity sensors, galvanic skin sensors, microphones, cameras, motion detection sensors, sensors on smart watches such as heart rate monitors, accelerometer, sensors on mobile devices such as Global Positioning System (GPS), microphones, camera and the like. In examples, the sensors 147 may be used to monitor the emotional state of the users 112. The other sources 113 of interactions may include social media posts of users, documents authored by users, data captured by the sensors 113 such as microphones, natural language interactions captured using microphones or cameras, galvanic skin sensor data, natural language interactions captured using mobile devices, data captured from phone conversations, data captured from recorded conference calls, data captured from voice over internet protocol calls, data captured during skype interactions, data captured during instant messenger interactions such as messenger services used in enterprises. The interaction collection system 111 may capture the interactions of the users 112 and place them on the data storage 193. In an example, the system 100 may interface with the interaction collection system 111 via network 119. The system 100, in another example, may include the interaction collection system 111. The network 119 may include a local area network (LAN), a wide area network (WAN), the internet, virtual private network, cellular data networks, satellite data networks or any other network that may be used to transfer information between users 112. The network 119 may have a number of routers attached to it, as well as a number of switches. The network 199 may include a LAN with discrete subnets or it may include multiple LANs, separated by a WAN. FIG. 1A is a simplified example of an expansive and complex enterprise network with examples of the multiple types of devices that may be utilized. Examples of network devices may include but are not limited to smartphone laptops, desktops, wireless access point, network bridge, servers, routers, switches and firewalls. In an example, one or more of the workstations 117 may include a camera 132 for monitoring one or more of the users 112.

The natural language processing artificial intelligence network and data security system 100, hereinafter system 100, includes natural language processing decoder 151, emotions model encoder 152, and artificial intelligence network and data security subsystem 153. The natural language processing decoder 151 for example, is able to detect textual features 199 in interactions 118 in the dataset 194 and convert the textual features 199 into a dominant emotional state 180 based on the emotional state of each interaction of a user, such as each of the users 112, as discussed in further detail below. Determining emotional state of user 112a is described below. In examples, the natural language processing decoder 151 may determine the emotional state of each of the users 112.

The emotions model encoder 152 may use the emotional state of each interaction 118a of the user 112a to create an emotions model 197. To generate the emotions model 197, the emotions model encoder 152 may use the types of each of the emotional states, the frequency of the emotional states, the intensity or hedonicity of the emotional states and the duration of the emotional states for the user 112a hidden in interactions 118 stored in the dataset 194. The artificial intelligence network and data security subsystem 153 may include an anomalous behavior detector 156 and a data protection 157 subsystem. The artificial intelligence network and data security subsystem 153 may use the emotions model 197 to determine anomalous behavior of a user 112a in the dataset 194 and utilize artificial intelligence to decide which proactive measures, and defensive measures to initiate in response to the emotional state of the user 112a perceived by the system 100.

The system 100 may include the data storage 137. The data storage 137 may include a hard disk, memory, or any type of non-transitory computer readable medium. The data storage 137 may store any data used by the system 101. The processor(s) 192 may be a microprocessor, a micro-controller, an application specific integrated circuit, field programmable gate array, or other type of circuit to perform various processing functions. The data storage 137 may store machine readable instructions executed by the one or more processors 192 to perform the operations of the system 100.

The interaction collection system 111 may be a server or other type of computer system that collects natural language interactions between users 112 and stores them in the data storage 193a. For example, the interaction collection system 111 may intercept the interactions such as emails or voice over internet protocol interactions between users 112 from a server used by the enterprise. In an example, some of the servers used by the enterprise may be located in the cloud. The interaction collection may intercept interactions 118 from a gateway server in the enterprise through with the emails, the voice over internet protocols traffic, instant messages and the like are transmitted or stored. The interaction collection system 111 may store the interactions in the dataset 194. Examples of electronic interactions in the dataset 194 may include an email sent by the users 112, documents authored by the users 112, recorded audio interactions of the users 112, a recorded video interactions of the users 112, a series of emails involving the users 112, one or more documents authored by the users 112 and the like. In an example, the interaction collection system 111 may collect information about users from social media such as twitter, Facebook, snapchat and other such systems to add to the dataset 194.

The interaction collection system 111 may also be connected to sensors 147 to collect information about the user 112a from devices such as cameras, biometric sensors, mobile devices and the like.

In an example the natural language processing decoder 151 may generate the textual features 199 using natural language processing methods including lemmatization, morphological segmentation, part-of-speech tagging, parsing, sentence breaking, stemming, word segmentation, terminology extraction, lexical semantics, machine translation, named entity recognition, relationship extraction, textual entailment analysis, sentiment analysis, topic segmentation, word sense disambiguation, discourse analysis, speech recognition, speech segmentation and the like. In an example, the natural language processing decoder 151 may generate the textual features 199 as described in further detail below and store the generated textual features in data storage 193 for further processing.

In an example, assume a dataset 194 includes the interactions 118 such as emails sent by a user 112a during a period of time. The system 100 may process each of the interactions 118 during a period of time to account for the emotional cycles of the user 112a. In an example, emotional cycles of users may be measured in days. The interaction collection system 111 may detect the interactions 118 involving the user 112a. For example, an email sent by the user 112a may be an interaction involving the user 112a. The interaction collection system 111 may use the contextual information such as the from, to, cc and bcc fields in emails, the author meta data in documents, the meta data associated with files, user information of devices on a network and the like to collect interactions 118 involving the user 112a. In an example, the interaction detection device 111 may detect each of the interactions 118 between the users 112. For example, an email sent by the user 112a and received by the user 112b may be an interaction between users 112a-b. Also, contextual information may be used to determine the time of each of the interactions 118. As discussed below, the contextual information associated with each interaction 118a involving the user 112a may be used by the natural language processing decoder 151 to determine a chronological sequence of emotions for the user 112a.

The natural language processing decoder 151 may include a textual decoder 154 and an natural language processing decoder 151. To extract the emotional features, the textual decoder 154 may determine one or more textual features 199 shown as 199a, 199b etc., in each of the interactions 118. In an example, the textual features 199 may be a sentence, a phrase, a clause, a combination, or the like. In another example, the textual decoder 151 may determine one or more textual features 199 in each interaction 118a in the dataset 194. The textual decoder 154 may determine the one or more textual features 199 using natural language processing methods. Examples of natural language processing methods the natural language processing decoder may use include lemmatization, morphological segmentation, part-of-speech tagging, parsing, sentence breaking, stemming, word segmentation, terminology extraction, lexical semantics, machine translation, named entity recognition, relationship extraction, textual entailment analysis, sentiment analysis, topic segmentation, word sense disambiguation, discourse analysis, speech recognition, speech segmentation and the like. Examples of machine learning algorithms that the natural language processing decoder 151 may be use includes linear regression logistic regression, decision tree, support vector machine, Naïve Bayes, K-Nearest Neighbors, K-Means, Random Forest, Dimensional Reduction Algorithms, Gradient Boost, Adaboost and the like. In an example, the textual decoder 154 may preprocess the interactions 118 to remove blank spaces, punctuations, and conjunctions before applying natural language processing. In an example, the natural language processing decoder 151 may use text to speech conversion for audio interactions or for audio embedded in video interactions.

The natural language processing decoder 151 determine one or more emotional features 182 for each interaction 118a for the user 112a. The natural language processing decoder 151 may use an emotions index 186 to determine the emotional features 182 for each of the textual features 199. The natural language processing decoder 151 may use the emotions index 115 to determine one or more textual features 199 that correspond to each of the emotional features 182. In an example, the textual features 199 may be words and the emotions index 186 may map the textual features 199 to different types of emotional features 182. Examples of the emotions index 186 may include the Linguistic Inquiry and Word Count, extended twelve-emotion circle discussed in further detail below, and vector space representations matching words and emotions used in computational neural networks and the like. In an example, natural language processing decoder 151 may use the intensity of the emotional features or hedonicity value in the emotions index 186 to determine the weightage of each of the emotional features 182 in the interactions 118. In an example, the emotions index 196 may map cognitive processes that underlay emotional features 182 with one or more textual features 199 in the emotions index 186. Thus the natural language processing decoder 151 may map the types of emotional features 182 for each of the textual features 199 in each interaction 118a.

The natural language processing decoder 151 may determine the type of emotional state 180 that is predominantly expressed in each interaction 118a. In an example, the system 100 may determine the dominant emotional state for each interaction 118a based on aggregation of each of the emotional features 182 in each interaction 118a. In an example, the natural language processing decoder 151 may aggregate the emotions in each interaction 118a, using the frequency of appearance of an emotion in each interaction 118a and the intensity of the emotional features in each interaction 118a. The natural language processing decoder 151 may use the twelve emotions extended model discussed in further detail with reference to FIG. 2 to determine the intensity of the emotional features in each interaction 118a. In another example, the natural language processing decoder 151 may normalize the emotional features 182 identified in each interaction 118a to compare the emotional features 182 of different hedonicity or intensity. Thus, natural language processing decoder 151 may determine the emotional state 180 predominantly expressed in each interaction 118a. In an example, the natural language processing decoder 151 may determine the emotional state 180 of textual features 199 in each interaction 118a.

The emotions model encoder 152 may determine a chronological sequence of emotional states 181 for the user 112a based on the contextual data such as time of each interaction and the emotional state 180 for each interaction. Similarly, the emotions model encoder 151 may also determine the chronological sequence of emotional states 181 of emotional states for users 112. In an example, the emotions model encoder 152 may determine the time of each interaction 118a based on the time of sending such as in the case of emails. In another example, the emotions model encoder 152 may determine the time of each interaction 118a based on the file parameters such as time of creation, time of modification and the like. The emotions model encoder 152 may determine chronological sequence of emotional states 181 to determine the frequency of emotional features, the running time of each emotional feature, the probability of transition of states, the entropy of the emotional state of the user 112a, the emotions model 197 such as the Markov emotions model, and the like.

The emotions model encoder 152 may determine the emotions model 197 of the user 112a using the chronological sequence of emotional states 181 for the user 112a. In an example, the emotions model encoder 152 may determine the probability of transition values 178 between the different types of the emotional states for the user 112a. The emotions model encoder 152 may generate the emotions model 197 using the emotional states in the chronological sequence of emotional states 181 for the user 112a and the probability of transition values 178. An example of the emotions model 197 is an emotions model based on the Markov Chain, discussed in further detail with reference to FIG. 5. The artificial intelligence network and data security subsystem 153 may use the emotions model 197 to identify emotional bursts, running time of emotional bursts, entropy of the emotions model, steady state of the emotions model and the like.

The artificial intelligence network and data security subsystem 153 may determine an emotional stability value 174 of the user from the emotions model 197. The artificial intelligence network and data security subsystem 153 may determine the emotional stability value using emotional burst, emotional entropy of the user, the steady state of the user and the like. In an example, artificial intelligence network and data security subsystem 153 may determine the count of the interactions in the chronological sequence of emotional states 181 where the state of the user 112a does not transition to a new emotional state, i.e., running time of an emotional burst. In other words, the artificial intelligence network and data security subsystem 153 may determine how long the user 112a remains in an emotional state based on a count of the non-transitions after arriving at an emotional state. In an example, the artificial intelligence network and data security subsystem 153 may use the value determined, i.e., how long the user 112a a remains in an emotional state as the emotional stability value 174. If emotional bursts or the emotional stability value 174 happens infrequently i.e. with large running times, it implies that the user is emotionally stable. In contrast, if running times are small, it means that the user's emotional states change frequently and the user's emotion is less stable. In an example, artificial intelligence network and data security subsystem 153 may determine the emotional stability value 174 as a function of the average running time for emotions in the chronological sequence of emotions. In an example, artificial intelligence network and data security subsystem 153 may determine the emotional stability value 174 as a function of the count of transitions between emotional states and the count of interactions between each of the transitions. The count of interactions between each of the transitions may also provide the number of non-transitions after arriving at an emotional state. In an example, artificial intelligence network and data security subsystem 153 may determine the emotional stability value 174 based on an average count of transitions between each of the interactions for the user 112*a*. In another example, artificial intelligence network and data security subsystem 153 may obtain the emotional stability value 174 using the count of interactions between the transitions of emotional states and the emotions model 197, to calculate a weighted average of the count of interactions between each of the transitions between the emotional states for the user 112*a*.

In another example, the artificial intelligence network and data security subsystem 153 may determine the emotional stability value 174 as entropy of the emotions model 197 which may be a Markov model. The entropy of the emotions model 197 may be based on the time density of the emotional states in the chronological sequence of emotional states for the user 112*a*. In other words, the larger the emotional stability value 174 calculated using the emotions model 197, the less the emotional stability of the user 112*a*.

The artificial intelligence network and data security subsystem 153 may include an anomalous behavior detector 156. The anomalous behavior detector 153 may determine whether the emotional stability value 174 of the user 112*a* is within a stability threshold 125. In an example, the stability threshold 125 may be determined based on the average emotional stability value of users. The emotional stability value 174 of the user 112*a* may be within the stability threshold 125, for example, when the emotional stability value 174 determined by the user is within a range above and below the average emotional stability value of the users 112. The anomalous behavior detector 153 may use the emotions model 197 to identify anomalous behavior of the user 112*a*.

The artificial intelligence network and data security subsystem 153 may use artificial intelligence to enable proactive monitoring of the user 112*a* using sensors 147. Examples of the sensors 147 may include cameras, GPS tracking via user mobile devices, biometric sensors. In other examples, the artificial intelligence network and data security subsystem 153 may monitor network usage, track data accessed by the user 112*a* and the like. In an example, the artificial intelligence network and data security subsystem 153 may then send an instruction to the workstation 117 to activate a camera 132 to monitor the emotional state of the user 112*a*. The artificial intelligence network and data security subsystem 153 may determine based on the anomalous behavior and the severity of the threat, whether to impose security restrictions to protect data. In an example, artificial intelligence network and data security subsystem 153 may send an instruction to the workstation 117 through the network 119 to disable user access. In another example, the artificial intelligence network and data security subsystem 153 may use the data protection 157 to revoke access to data for the user 112*a* using a directory services 167 to disable user access. Other examples of actions the data protection 157 may take includes alerting the manager of the user, deactivating access card, disabling access to secure networks and the like.

The artificial intelligence network and data security subsystem 153 may determine a relative rating of a subset of two users using a Colley's Method formula. The artificial intelligence network and data security subsystem 153 may determine a win-loss table between sub-sets of two users to obtain the inputs for the Colley's Method formula. In an example, artificial intelligence network and data security subsystem 153 may use the count of emotional states of the two users during the same period of time to determine the win-loss for that period of time. In another example, the artificial intelligence network and data security subsystem 153 may use each emotional state of each of the two users during a period of time and match the emotional states one to one to determine the win-loss table. In other words, the artificial intelligence network and data security subsystem 153 may use the interactions of the two users during the same period of time to determine the win-loss table. In another example, the artificial intelligence network and data security subsystem 153 may use the entropy of the emotions model such as emotions model 197 for each of the two users during the same period of time as inputs to determine the win-loss table.

Colley's Method is a rating that uses head-to-head matches. Colley's rating (r) is obtained by solving the linear equation $C_r = b$. C is the Colley Matrix, a real symmetric positive definite matrix; and b is a right-hand side vector:

$$C_{ij} = \begin{cases} 2 + t_i & i = j \\ -n_{ij} & i \neq j \end{cases} \quad (1)$$

$$b_i = 1 + \frac{1}{2}(w_i - l_i) \quad (2)$$

where $t_i$ the total number of emotional states or interactions for the user is i; $n_{ij}$ is the number of times user i faced userj; $w_i$ is the total number of wins accumulated by the useri; $l_i$ is the total number of losses accumulated by user i.

The artificial intelligence network and data security subsystem 153 may determine the relative rating for users 112 in the dataset 194 based on the Colley's ratings taken two at a time and compiling the Colley's ratings for sub-sets. In an example, the Colley's ratings may be determined for direct interactions between the user 112*a* and the user 112*b* to determine the Colley's rating for each interaction. In another example, the Colley's ratings may be determined for interactions between the user 112*a* and the user 112*c*, and the interactions between the user 112*b* and the user 112*d*. In an example, the user 112*c* and the user 112*d* of the previous example may be the same user.

In an example, the artificial intelligence network and data security subsystem 153 may use the relative ranking to identify the user 112*a* expressing emotions that fall within a ranking threshold. The artificial intelligence network and data security subsystem 153 may determine the user 112*a* in the Colley's ranking falls within a ranking threshold, when the user 112*a* expresses more emotions than other users. In an example, the artificial intelligence network and data security subsystem 153 may determine the user 112*a* expressing more emotions compared to other users in the Colley's ranking may be engaged in subversive activities. Also, the artificial intelligence network and data security subsystem 153 may determine that users with insufficient exchanges may be rated higher in the Colley's ranking. In an example, the artificial intelligence network and data security subsystem 153 may use the steady state, or entropy of the emotions model 197 such as emotions model 197 to determine the Colley's ranking.

Although the functions described herein include functions performed by the natural language processing decoder 151, the emotions model encoder 152 and the artificial intelligence network and data security subsystem 153, the functions may be performed in other embodiments by one or more subsystems. It should be understood that FIG. 1A is for illustrative purposes only and does not depict the entire range of network and data security systems or network infrastructures that may be relevant in practicing the present invention. It will be further appreciated that network connections for the network devices may be established through any suitable interface and protocols, such as TCP/IP, Frame Relay, Ethernet, FTP, HTTP and the like, is presumed. Also, it will be apparent that the system 100 may include network devices and network configurations other than shown.

Figure 1B:
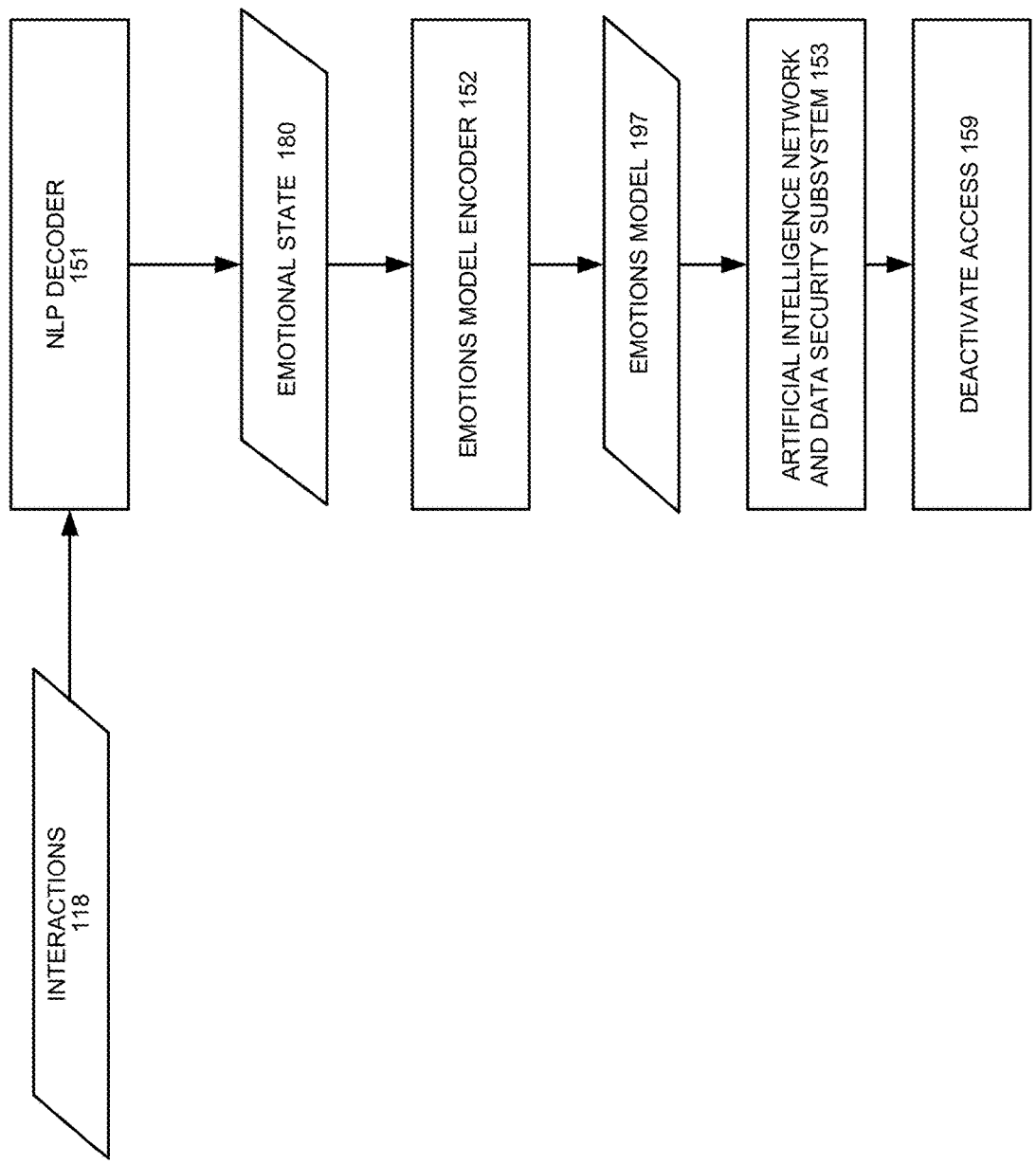
FIG. 1B illustrates a data flow for the natural language processing artificial intelligence network and data security system, according to an embodiment.

FIG. 1B illustrates an example data flow for the natural language processing artificial intelligence network and data security system 100, according to an embodiment. In an example, in the system 100, the natural language processing decoder 151 may use the dataset 194 with the interactions 118 to determine the emotional state 180 that is predominant in each interaction 118a for the user 112a. The emotions model encoder 152 generates an emotions model 197 based on the chronological sequence of emotional states 181 of each user 112a. The artificial intelligence network and data security subsystem 153 then detects anomalous behavior of the user 112a based on the emotions model 197. The data protection 157 subsystem may then be used to deactivate access 159 to the user 112a.

In an example, the interactions 118 are processed by the natural language processing decoder 151 to determine the emotional state 180 of the user 112a. The emotions model encoder 152 may generate the emotions model 197 for the user 112a. The emotions model 197 is then used by the artificial intelligence network and data security subsystem 153 to determine anomalous behavior of the user 112a. The artificial intelligence network and data security subsystem 153 may deactivate access of the user 112a based on the anomalous behavior of the user 112a.

Figure 2:
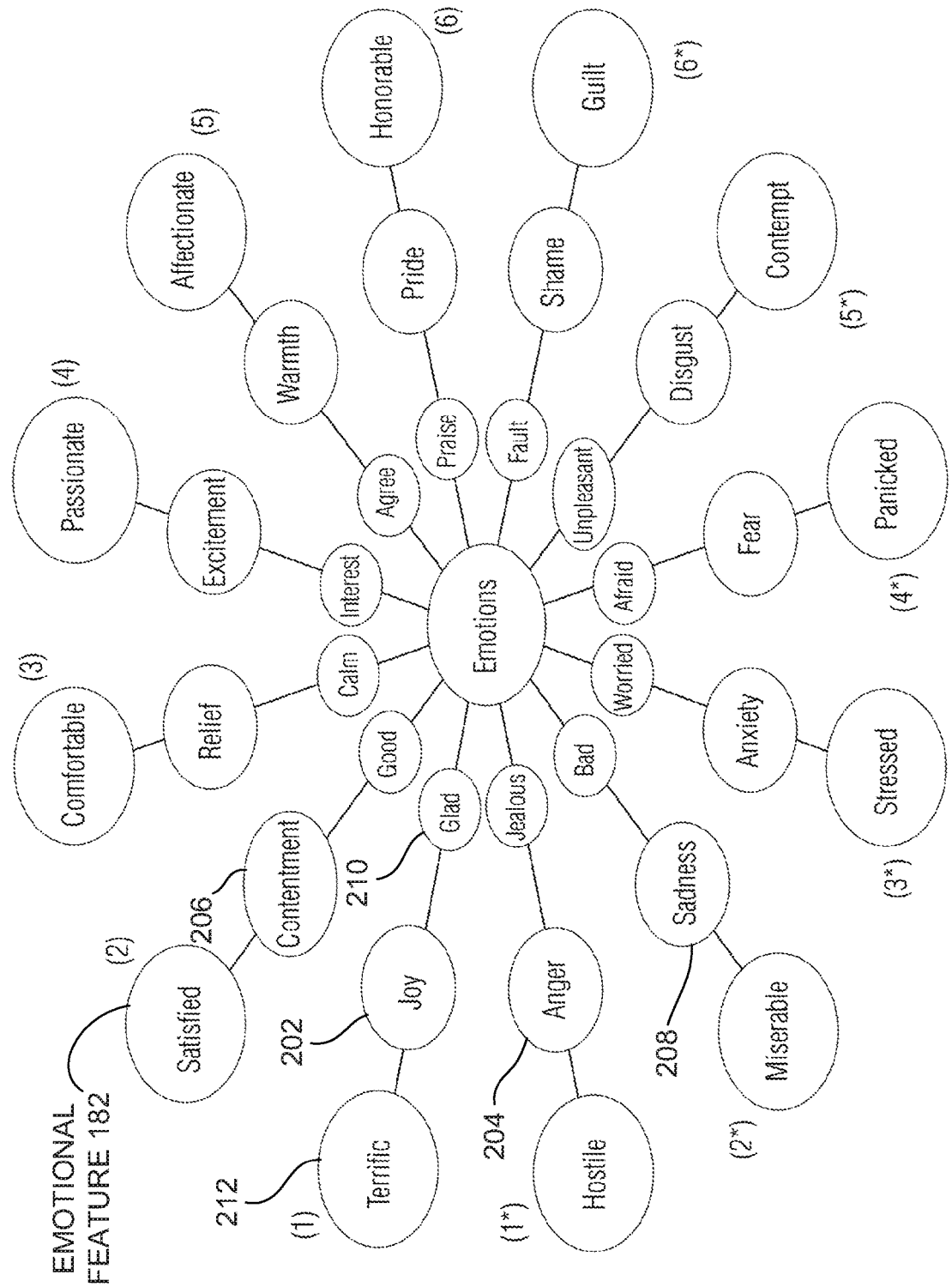
FIG. 2 illustrates an example of an emotion categorization with twelve extended emotions that may be used in the emotions index, according to an embodiment.

FIG. 2 shows an example of an emotional categorization with twelve extended emotions that may be used in the emotions index 186. The natural language processing decoder 151 may use the emotions index 186 that maps one or more textual features 199 to emotional features 182 to categorize emotions. In an example, the natural language processing decoder 151 may use the emotions index 186 with the emotional categorization shown in FIG. 2 to determine the emotions expressed in the interactions 118. In an example, the emotions index 186 may use emotional categorization that is balanced, and may pair six basic emotions, and each negative emotion is paired with its positive counterpart. In an example, as shown in FIG. 2, the negative emotions used in the emotions index 186 may include anger, sadness, fear, disgust, anxiety and shame. In an example, the emotional categorization may avoid emotions that imply other emotions. For example, the emotion surprise may imply other emotions and may not be included in the emotional categorization. In another example, the emotions index 186 may include positive emotions that are opposite emotions to the negative emotions namely: joy for anger, contentment for sadness, relief for anxiety, excitement for fear, affectionate for disgust, and pride for shame. These twelve emotional feature type classifications are shown in FIG. 2 as a three layered circle, representing different hedonicity. In the emotional feature type classification shown in the FIG. 2, an upper positive emotion may be considered as an opposite of the lower negative with the same order. For example, the emotional feature joy 202 is the opposite of anger 204, contentment 206 is the opposite of sadness 208. In an example, the emotions index 186 may implement this scheme as a six-dimensional space, with negative emotions represented using negative values, and positive emotions represented using positive values. Also, the emotions index 186 may include degrees of hedonicity for each emotional feature. For example, the circle sizes denote different intensity of emotional feature or hedonicity. In an example, the emotional feature glad 210 exhibits less hedonicity than joy 202, while terrific 212, which mean extremely good; excellent, exhibits more hedonicity. The natural language processing decoder 151 may use the hedonicity value to determine the emotional features 182 of the user 112a for each interaction 118a and allocate the appropriate weights to the different types of emotional features 182 while determining the emotional state for each interaction 118a.

The natural language processing decoder 151 may use the emotions index 186, to determine emotional features 182 corresponding to textual features 199 in the interactions 118. The natural language processing decoder 151 may use the emotions index 186 and map the textual features 199 as discussed above with reference to FIG. 1A to emotional features 182. In an example, the textual features in the dataset 194 and the emotions index 186 may be sentences. In another example, the textual features in the dataset 194 may be sentences, whereas the textual features in the emotions index 186 may be words.

In an example, assume an interaction 118a involving the user 112a includes the following sentences:

"wow—you are really busy if your lunch calendar is booked for the remainder of the month! sept. lunch sounds good. i sure hope we make good use of the bad news about skilling's resignation and do some housecleaning can we write down some problem assets and unwind raptor? i've been horribly uncomfortable about some of our accounting in the past few years and with the number of 'redeployments' up, I'm concerned some disgruntled employee will tattle. can you influence some sanity?"

The system 100 while preprocessing the interaction 118a removes punctuations and exclamation marks. In an example, the natural language processing decoder 151 may also perform operations such as string matching, string searching and sentence parsing to determine the textual features 199. The natural language processing decoder 151 may determine the textual features 199, which may be as follows:

wow—you are really busy if your lunch calendar is booked for the remainder of the month!

sept. lunch sounds good.

i sure hope we make good use of the bad news about skilling's resignation and do some housecleaning can we write down some problem assets and unwind raptor?

i've been horribly uncomfortable about some of our accounting in the past few years and with the number of 'redeployments' up, I'm concerned some disgruntled employee will tattle.

can you influence some sanity?"

The natural language processing decoder 151 may determine the emotional features 182 in each textual feature 199a based on the emotional index 186. The result of the emotion detection may be as follows:
- emotional feature 1: no emotion is detected;
- emotional feature 2: good is detected as positivity;
- emotional feature 3: hope and good are detected as positivity; resignation is detected as sadness;
- emotional feature 4: horribly and uncomfortable are detected as anxiety;
- emotional feature 5: no emotion is detected.

- emotional feature 3: hope and sure implies contentment, good implies joy, problem implies anxiety, and bad implies sadness;
- emotional feature 4: disgruntled implies disgust, uncomfortable implies anxiety, concerned implies interest, and horribly implies fear; and
- emotional feature 5: nothing is detected The natural language processing decoder 151 may determine the following percentages as shown in Table 4.

TABLE 4

Extended emotions labeled from different types of emotional features in interaction 118a

| Joy | Contentment | Interest | Anxiety | Disgust | Fear | Sadness |
|---|---|---|---|---|---|---|
| Wow good | Sure hope | Concerned | Problem uncomfortable | Disgruntled | Horribly | Bad |
| 27.3% | 18.2% | 9.1% | 18.2% | 9.1% | 9.1% | 9.1% |

The natural language processing decoder 151 may then determine a count of the different emotional features in the interaction 118a. For example, the natural language processing decoder 151 may determine the count as a simple aggregation of the types classification of emotional features 182 detected.

TABLE 1

Count of different emotional features in interaction 118a.

| Positive | Anger | Anxiety | Sadness |
|---|---|---|---|
| 3 | 0 | 2 | 1 |

The natural language processing decoder 151 may normalize the count of types of emotions in interaction 118a.

TABLE 2

Normalized distribution of different types of emotional features in interaction 118a.

| Positive | Anger | Anxiety | Sadness |
|---|---|---|---|
| 50% | 0 | 33.3% | 16.7% |

In another example, the natural language processing decoder 151 may determine a normalized count of types of emotional features in the interaction 118a based on a six-cognitive-process categorization including certainty, tentative, discrepancy, causation, differentiation, and insight.

TABLE 3

Normalized distribution of different types of emotional features in interaction 118a.

| Certainty | Tentative | Discrepancy | Causation | Differentiation | Insight |
|---|---|---|---|---|---|
| 0% | 50% | 14.3% | 21.4% | 14.3% | 0% |

Figure 3A:
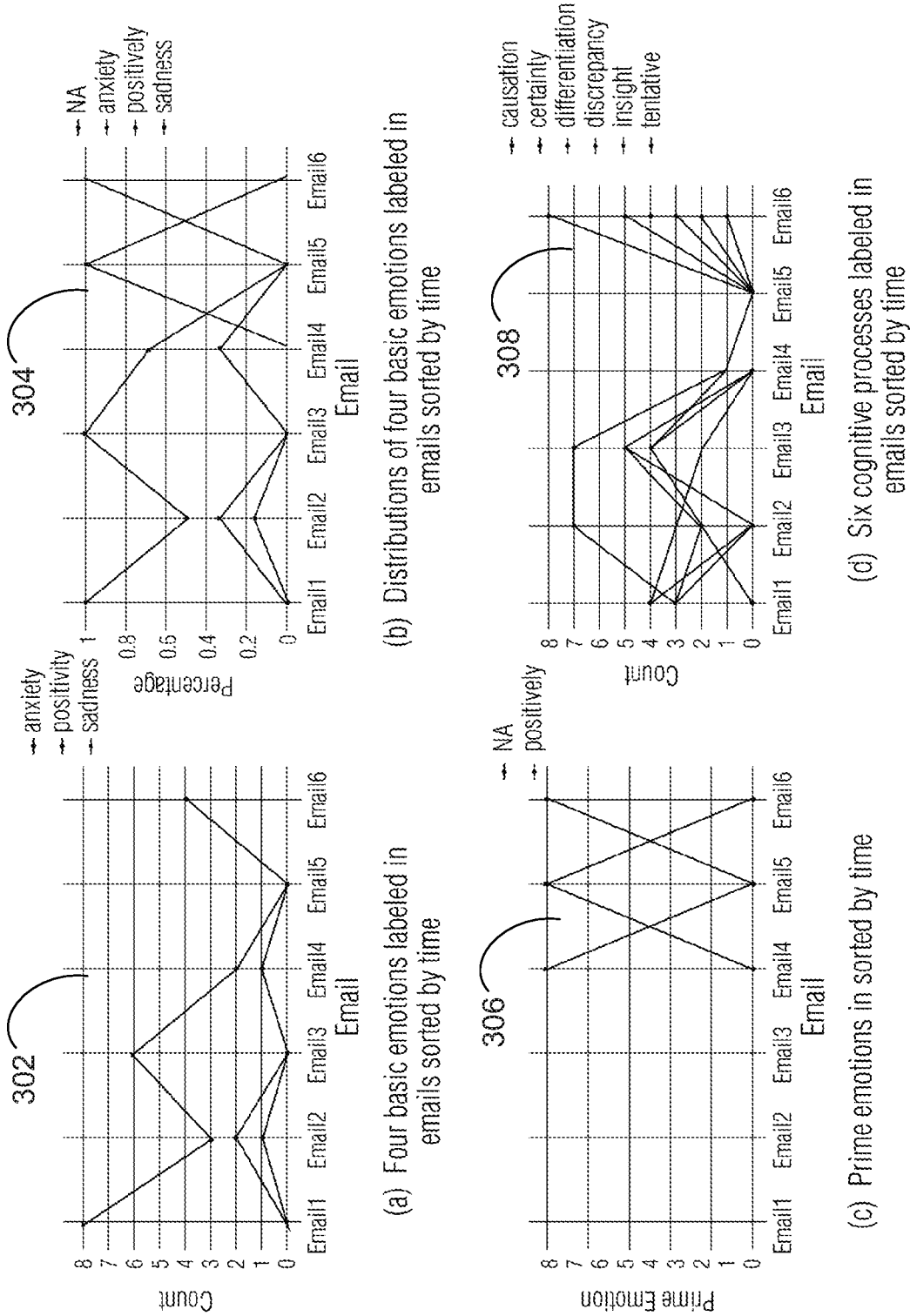
FIGS. 3A-B illustrates examples of chronological sequences of emotions in interactions determined by the system, according to an embodiment.
Figure 3B:
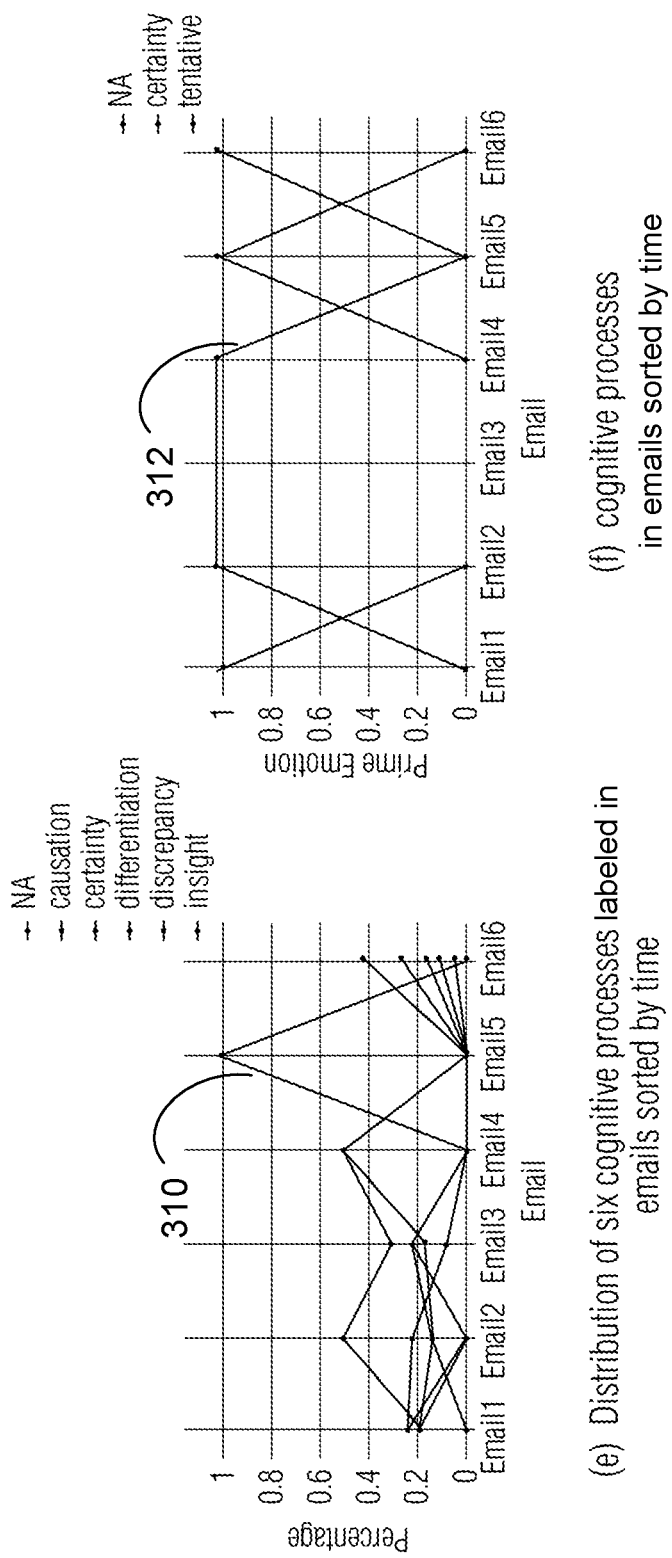

In another example, the natural language processing decoder 151 may determine a count of types of emotional features in the interaction 118a based on a twelve emotional feature index. The system 100 may determine the following:
- emotional feature 1: wow implies joy;
- emotional feature 2: good also implies joy;

FIGS. 3A and 3B shows examples of chronological sequence of emotional features in interactions determined by the system 100, according to an embodiment. In an example, the natural language processing decoder 151 may determine the chronological sequence of emotions for interactions 118 of the user 112a during a period of time or per unit time. In an example, assume the interactions are emails of the user 112a and assume the emotions index 186 is based on a four basic emotional features characterization. The natural language processing decoder 151 may determine as shown in the graph 302 the chronological sequence of interactions 118. For example, the graph 302 shows the number of emails sent by the user 112a and the number of emotions of each type of emotion detected in the email. The natural language processing decoder 151 may normalize the number of emotions as a percentage as discussed above with respect to FIG. 3A. The graph 304 in FIG. 3A shows the normalized emotional features 182. Also, the graph 304 shows the dominant emotional feature among the different emotional features 182. The natural language processing decoder 151 may determine the dominant emotions in the emails. In an example, a dominant emotion may be an emotion that dominates over the other emotions in the chronological sequence of emotional features. The system 100 may normalize the dominant emotion to determine an emotional state 180 of the user for the interaction 118 as shown in graph 306. Also, the natural language processing decoder 151 may determine the chronological sequence of emotional features based on the six cognitive processes in the emails. In an example, the natural language processing decoder 151 may generate the chronological sequence of six cognitive processes sorted by time as shown in graph 308. The natural language processing decoder 151 may normalize the six cognitive processes to depict the six different emotional states into a percentage as shown in graph 310. natural language processing decoder 151 may then determine the dominant cognitive process as shown in graph 312 based on the emotional process with the highest percentage in the normalized distribution as shown in graph 310.

Figure 4A:
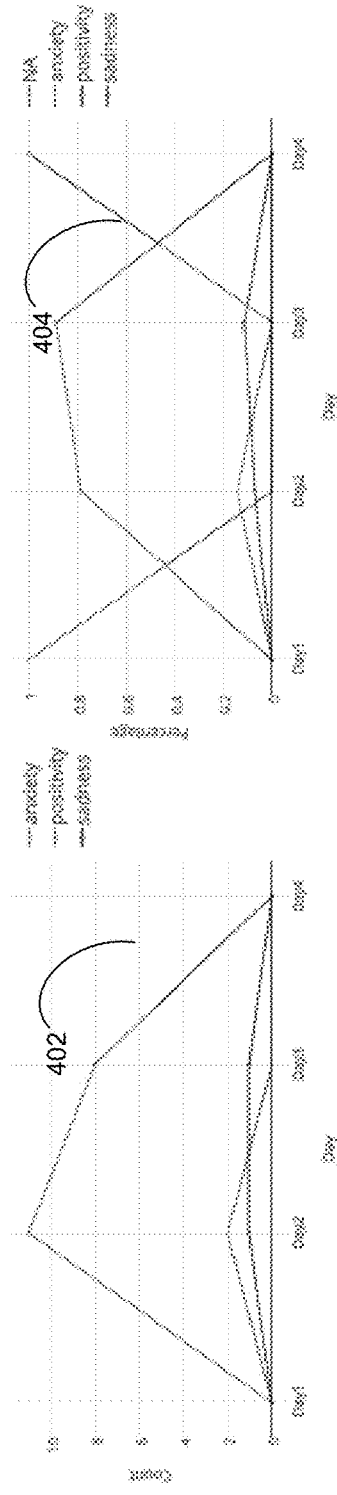
FIGS. 4A-B illustrates additional examples of chronological sequences of emotions in interactions determined by the system, according to an embodiment.
Figure 4A:
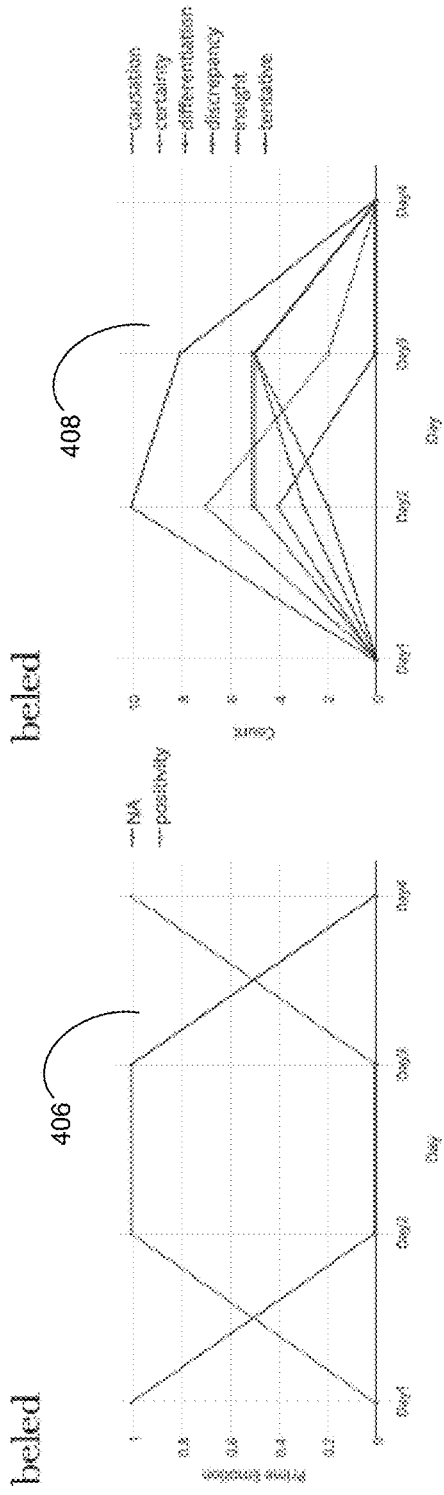
Figure 4B:
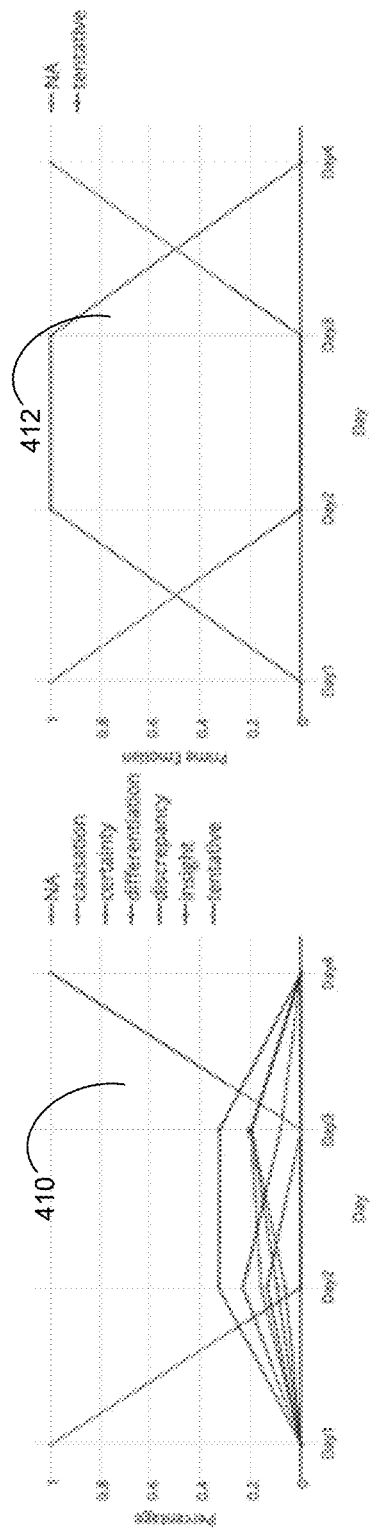

FIGS. 4A and 4B show examples of chronological sequence of emotional features in interactions determined by the system 100, according to an embodiment. The natural language processing decoder 151 may determine the chronological sequence for interactions 118 of the user 112a during a period of time. In an example, assume the period of time is over the course of a day. The natural language processing decoder 151 may determine the as shown in the graph 402 the chronological sequence of four basic emotions. The graph 402 shows the count of different emotions each day. The natural language processing decoder 151 may normalize the count of different emotions each day as shown in graph 404 and reduce count to percentage. The natural language processing decoder 151 may then determine the emotion that dominates based on the percentage as shown in graph 404. The dominant emotions on each day may be represented as shown in graph 406, as an aggregation of the normalized emotions shown in graph 406. The natural language processing decoder 151 may determine the chronological sequence of six cognitive processes associated with the emotional features every day as shown in graph 408. The natural language processing decoder 151 may normalize the chronological sequence of cognitive processes as shown in graph 410. The natural language processing decoder 151 may then determine the dominant cognitive process every day as shown in graph 412.

Figure 5:
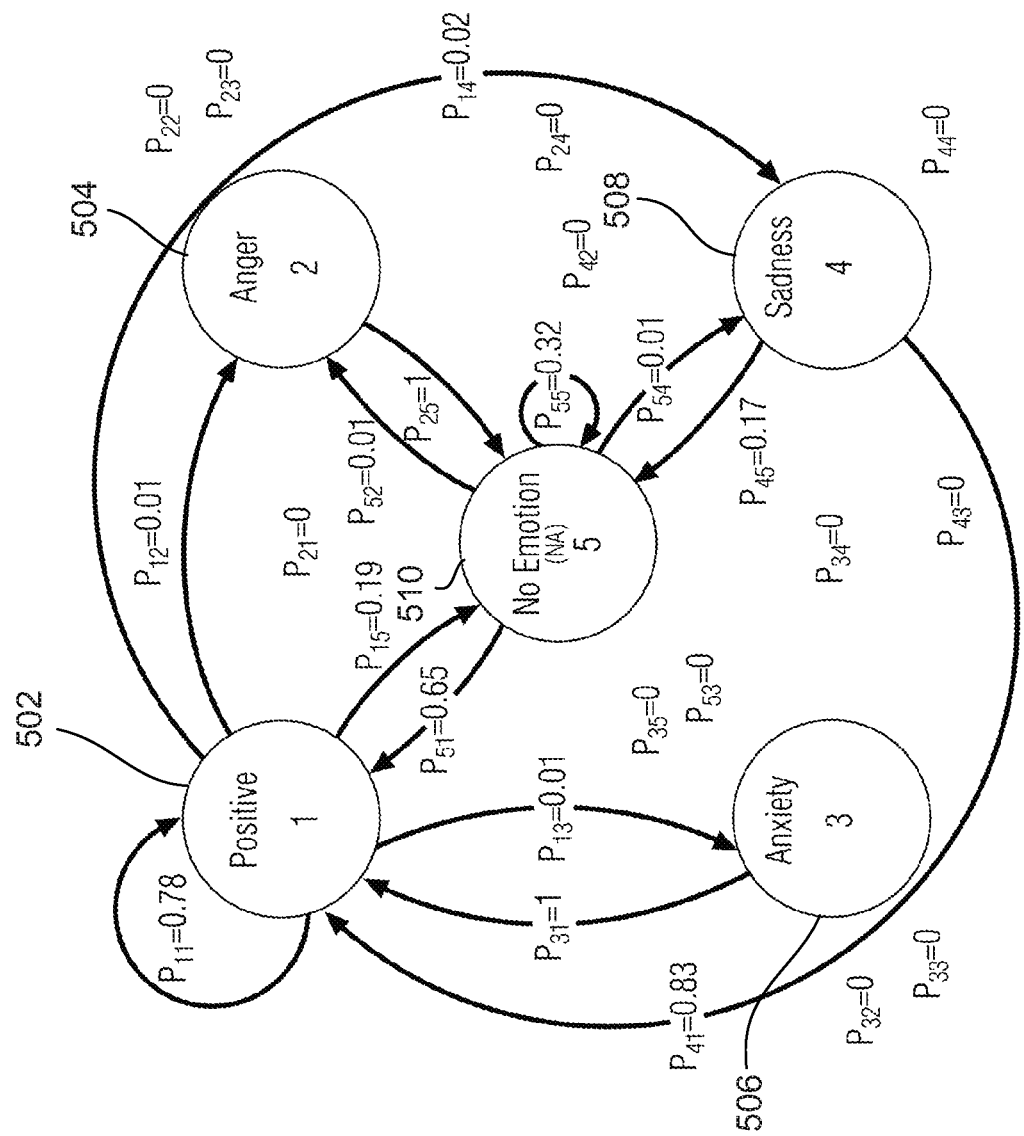
FIG. 5 illustrates an emotions model for a user determined by the system, according to an embodiment.
Figure 6A:
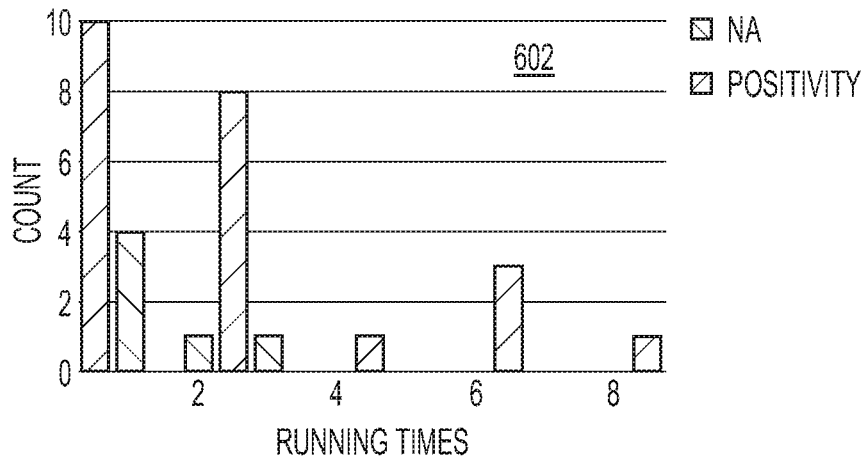
FIGS. 6A-D illustrate examples of emotional burst for a user determined by the system, according to an embodiment.
Figure 6B:
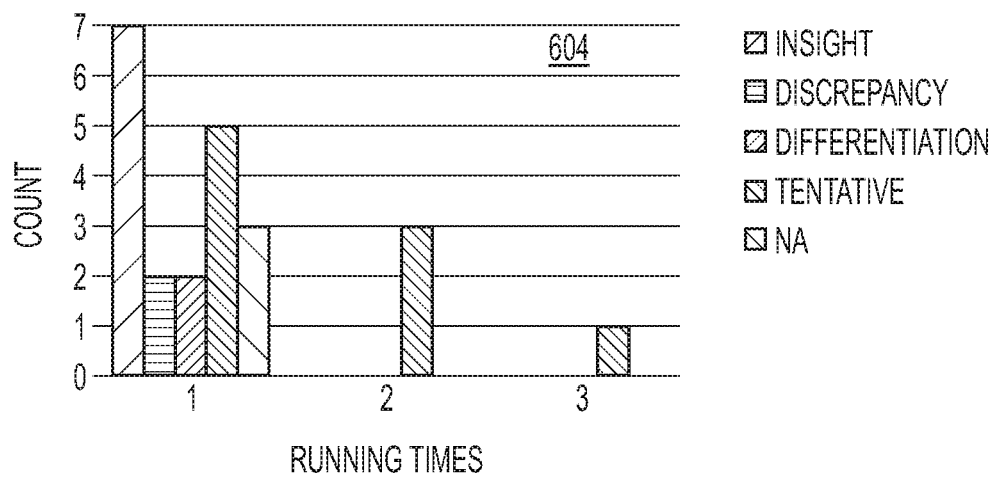
Figure 6C:
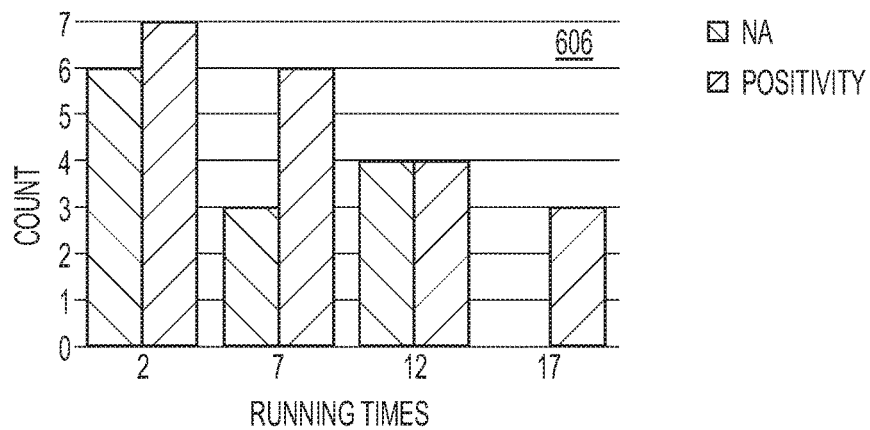
Figure 6D:
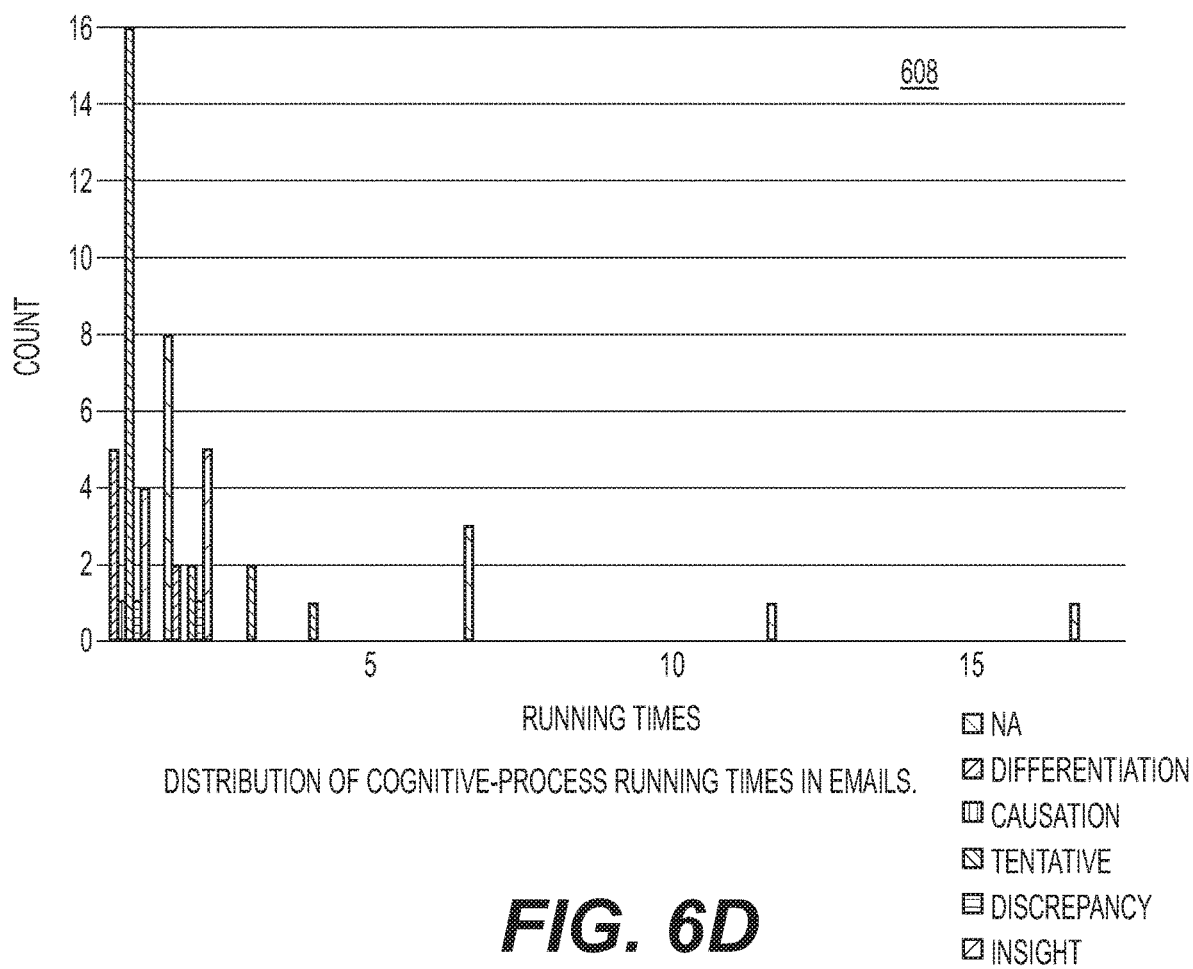
Figure 7A:
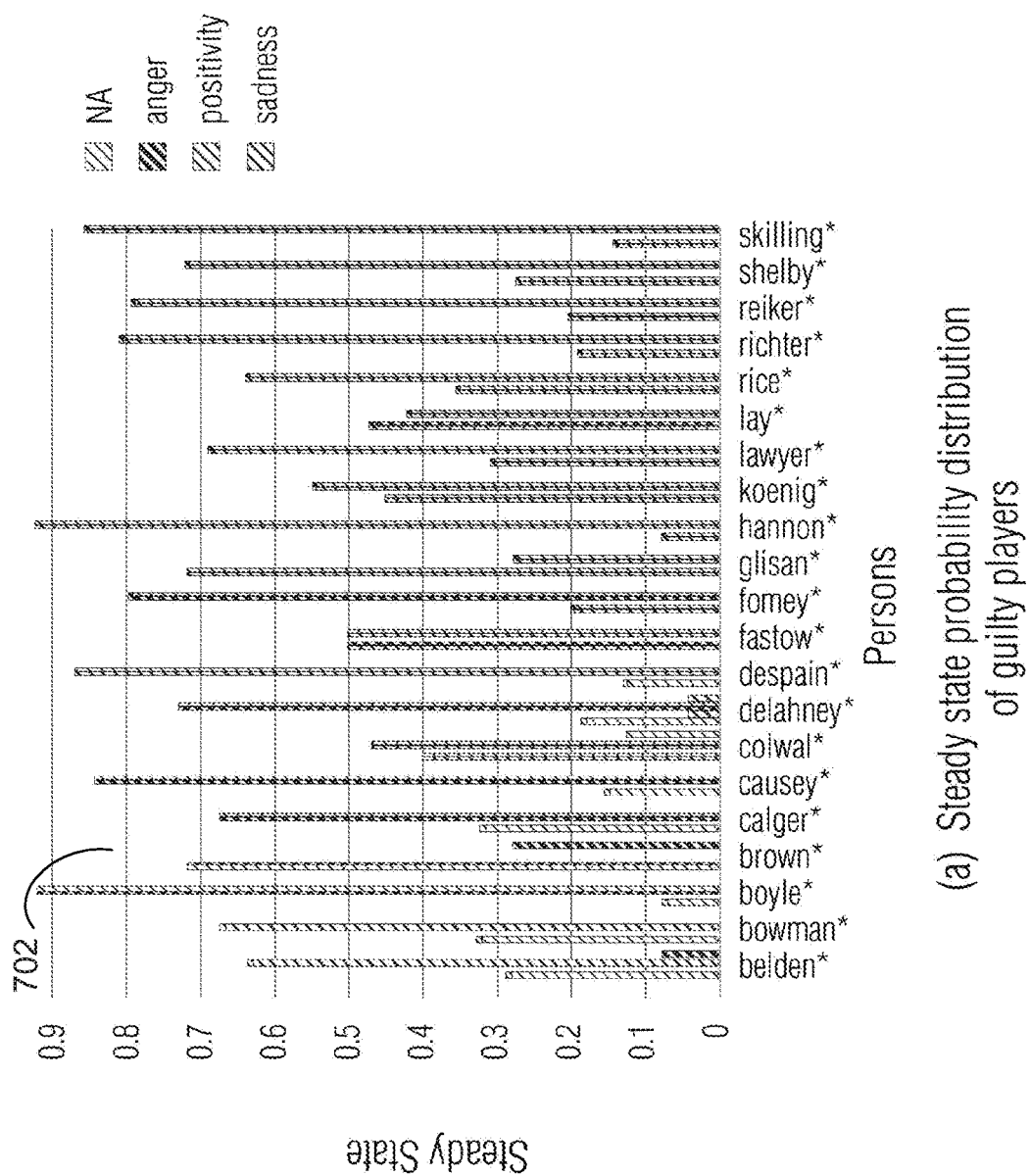
FIGS. 7A, 7B, 7C and 7D illustrate examples of Colley's ratings determined by the system, according to an embodiment.
Figure 7B:
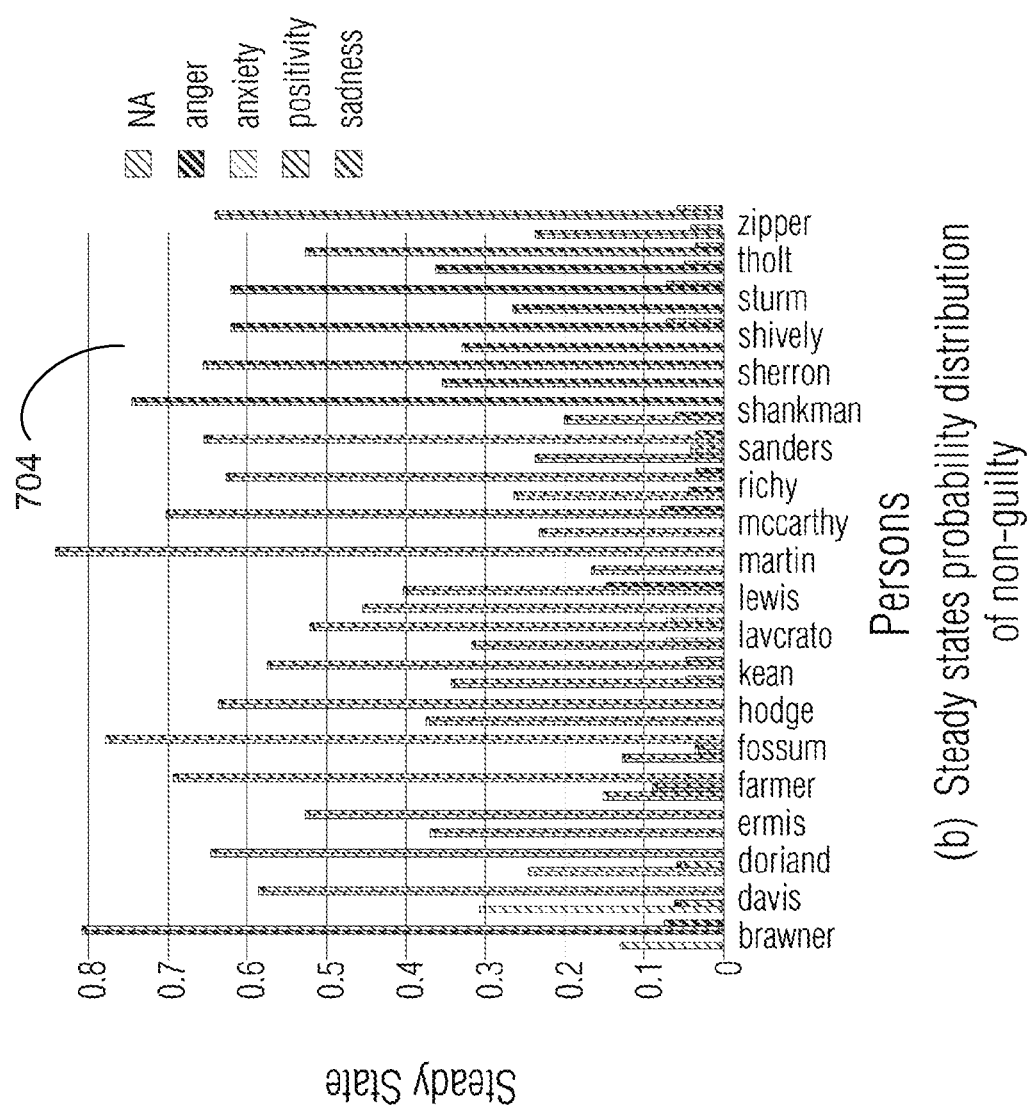
Figure 7C:
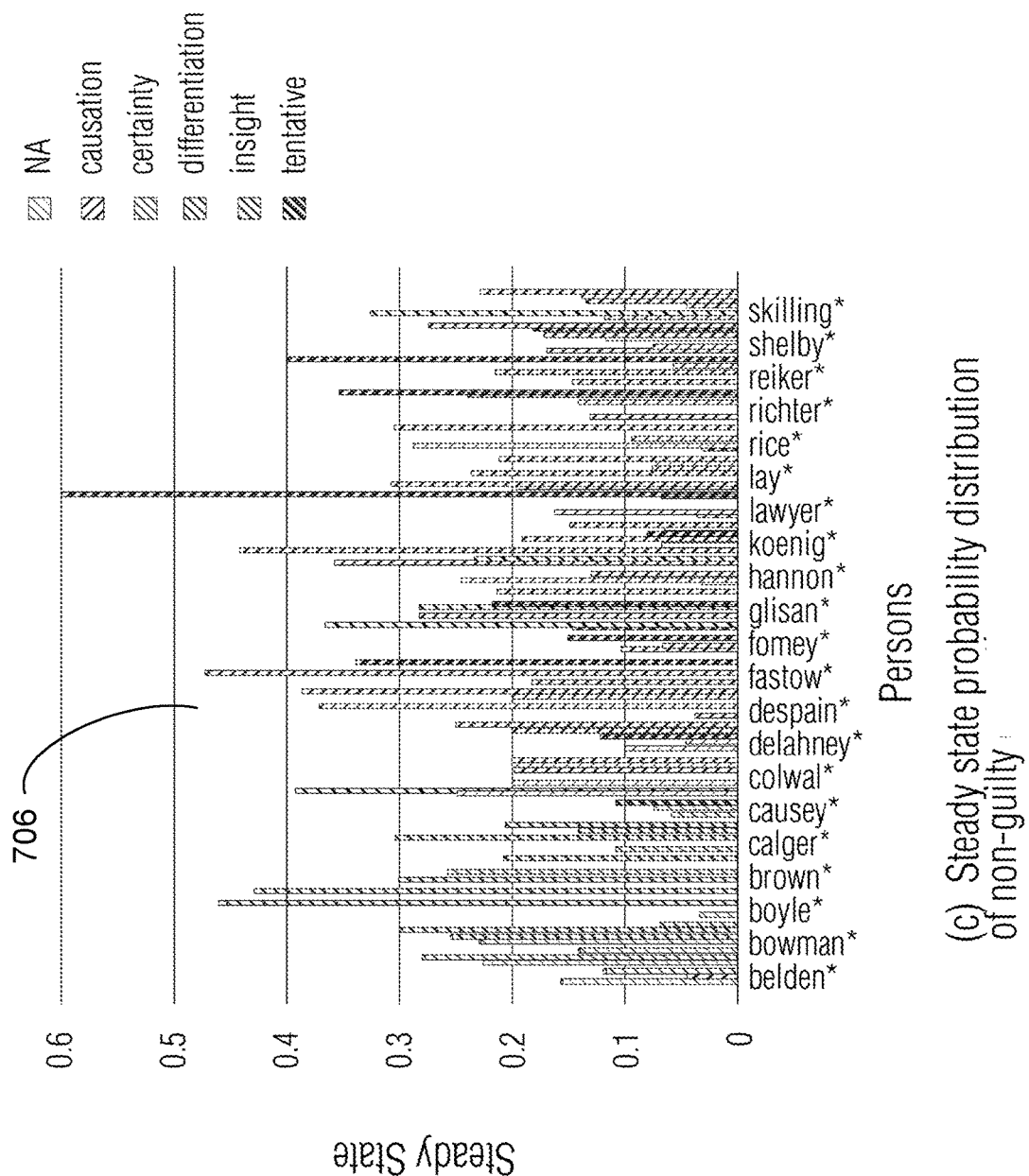
Figure 7D:
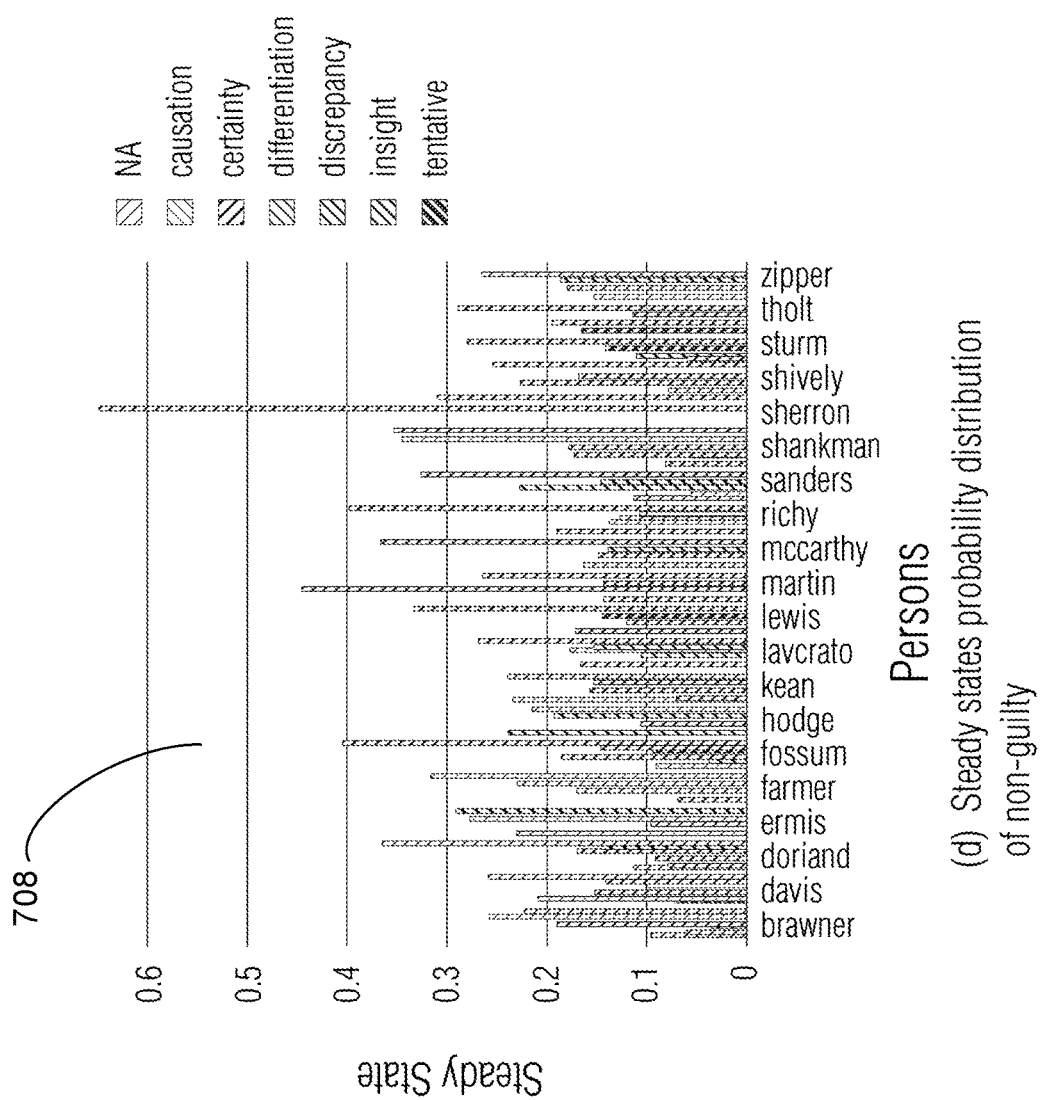

FIG. 5 shows an example of an emotions model 197 determined by the system 100. The emotions model 197 may be a Markov model. The emotions model encoder 152 may generate the emotions model 197 for each of the users 112. For example, the emotions model encoder 152 may determine a probability of transitioning between different emotional states for the user 112a based on the chronological sequence of emotional states for the user 112a. In an example, emotions model encoder 152 may determine the probability of transition as follows. The emotions model encoder 152 may determine state maps for dominant emotions, determine a count of transition times for each dominant emotion, normalize transition times as transition probabilities and create a transition table to create the emotions model 197. In an example, assume as shown in FIG. 4A and graph 406 the dominant emotions move from no emotion to positivity to no emotion. The emotions model encoder 152 may determine as shown in FIG. 5 the state map moving from no emotion 510 to positivity 502 to no emotion 510. The emotions model encoder 152 may determine the count of the number of transitions and the running time for each emotional state. The emotions model encoder 152 may then normalize the transition times to determine transition probabilities and determine the transition probability matrix for dominant emotional states.

TABLE 5

Transition probability matrix for dominant emotional states

|  | NA | Anger | Anxiety | Positive | Sadness |
| --- | --- | --- | --- | --- | --- |
| NA | 0.325 | 0.015 | 0 | 0.649 | 0.015 |
| Anger | 1 | 0 | 0 | 0 | 0 |
| Anxiety | 0 | 0 | 0 | 1 | 0 |
| Positive | 0.187 | 0.008 | 0.008 | 0.778 | 0.020 |
| Sadness | 0.167 | 0 | 0 | 0.833 | 0 |

The emotions model encoder 152 may use the transition probabilities and the state information of states to determine the emotions model 197 of the user 112a. In an example, the emotions model encoder 152 may determine the emotions model 197 such as the Markov chain emotions model for the user 112a as shown in FIG. 5. In the Markov chain emotions model, The emotions model encoder 152 may use the transition probability that the user 112a may stay in the positive state of 0.78, the transition probability that the user 112a may transition to anger or 0.01, the transition prob-ability that the user 112a may transition to no emotion of 0.19, the probability that the user 112a may transition to sadness of 0.02 and the transition probability that the user 112a may transition to anxiety of 0.01, and the like for each transition between the states available from the data to create the emotions model 197. The artificial intelligence network and data security subsystem 153 may then determine the entropy rate. Also, the artificial intelligence network and data security subsystem 153 may then determine the steady sates. As discussed above with reference to FIG. 1, the entropy rate of the emotions model 197 may be the time density of the average information in the underlying stochastic process.

FIGS. 6A-D show examples of emotional burst between two individuals, determined by the system 100, according to an example. The artificial intelligence network and data security subsystem 153 may determine the running times for emotions in each of the interactions. For example, the system 100 may determine the emotion running time for positivity and no emotions based on the number of times the emotion was experienced by the user 112 consecutively as shown in graph 602. The system 100 may also determine the cognitive processes associated with emotions and the running time for each emotion as shown in graph 604. In an example, the graphs 606 and 608 show the running time for emotions and cognitive processes for a different user.

FIGS. 7A, 7B, 7C and 7D show examples of steady states for users determined by the system 100. The artificial intelligence network and data security subsystem 153 may differentiate between steady states for users who are not subversive as shown in graph 704 and who are subversive as shown in graph 702. Similarly, the artificial intelligence network and data security subsystem 153 as shown in in graphs 706 and graph 708 may determine the steady state probability distribution for cognitive states associated with emotions. The artificial intelligence network and data security subsystem 153 may determine whether the users as subversive or non-subversive based on the level of negative emotions. In an example, the artificial intelligence network and data security subsystem 153 may determine the subversive users who may express fewer negative emotions in their emails compared to non-subversive users.

Figure 8:
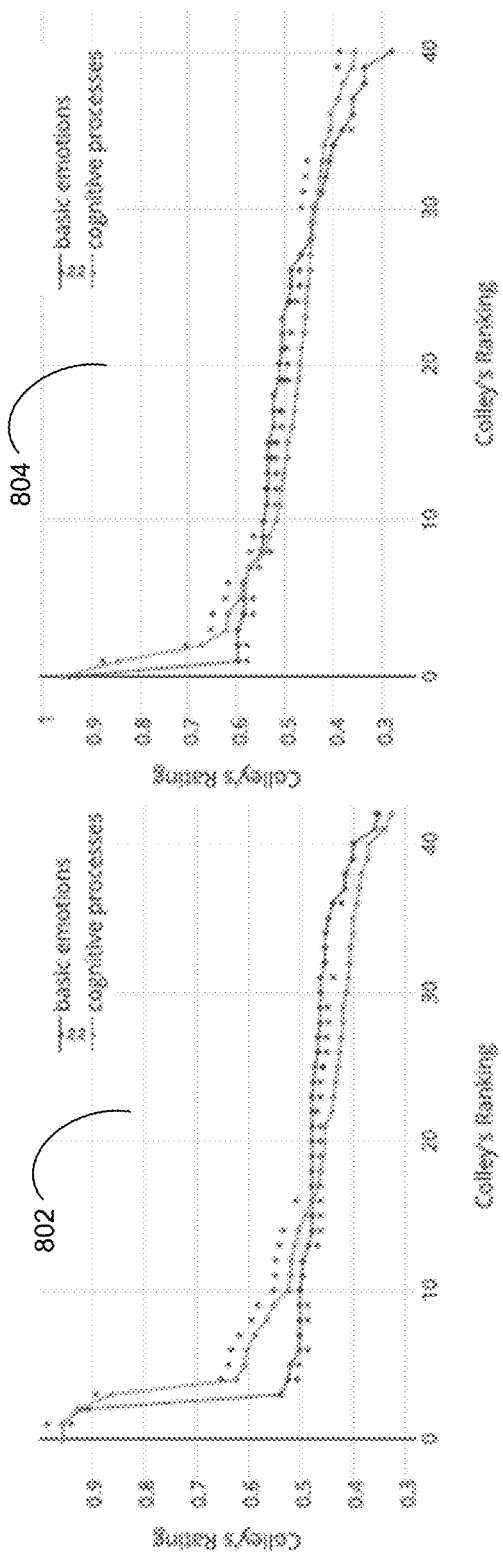
FIG. 8 illustrates, steady states for a user determined by the system, according to an embodiment.

FIG. 8 shows examples of Colley's ratings determined by the artificial intelligence network and data security subsystem 153. The system 100 may determine the Colley's ratings based on the emotional state 180 of the interactions 118 of one user or the cognitive processes underlying the emotional state 180 of one user compared with those of another user. The artificial intelligence network and data security subsystem 153 may determine a win-loss table of interactions for the users 112 to determine the Colley's rankings as described above with reference to FIG. 1A. The artificial intelligence network and data security subsystem 153 may then create a relative ranking of interactions 118s for users 112 in the dataset 194 as shown in graphs 802 and 804. In an example, artificial intelligence network and data security subsystem 153 may determine the Colley's ratings based on the steady state probabilities of the emotional states of the user 112a. In another example, artificial intelligence network and data security subsystem 153 may use the relative ranking to determine any deviation from the mean anomalous behavior of the user 112a.

Figure 9:
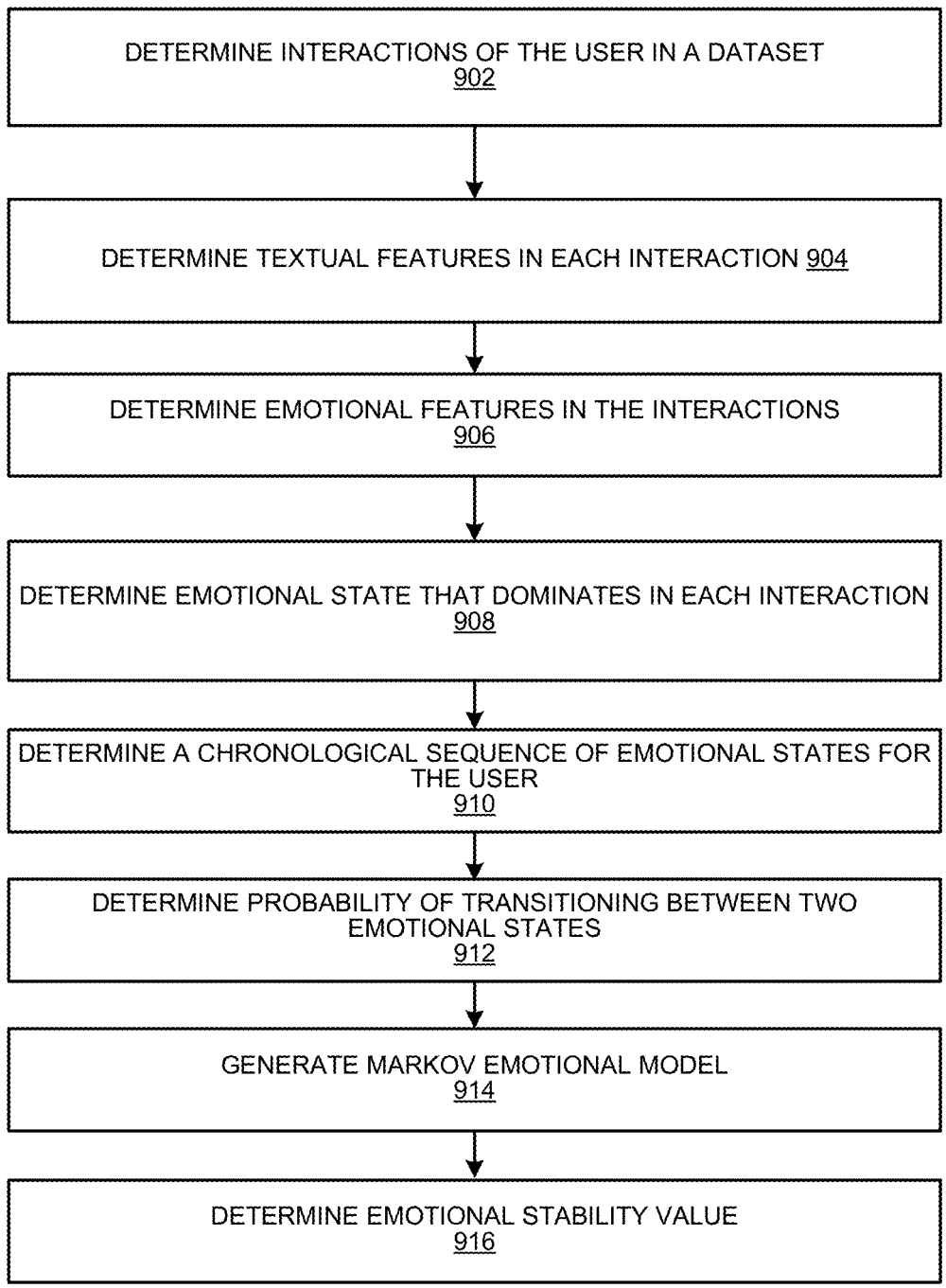
FIG. 9 illustrates, a method of generating an emotions model, according to an embodiment.

FIG. 9 shows a method 900 for generating an emotion model 197 such as a Markov emotional state and identifying an emotional stability value for the user 112a. The method 900 and other methods described below are described by way of example with respect to being performed by the system 100 shown in FIG. 1. Also, one or more of the steps of the methods described below may be performed in the order shown or in other orders or substantially simultaneously.

At 902, the system 100 identifies the interactions of the users 112 in the dataset 194. In an example, the interaction collection system 111 may identify interactions based on the "from" and "to" fields in emails. In another example, the interaction collection system 111 may identify the metadata associated with documents such as the name of the author and the date of creation, from and to fields in the text of the document and the like to identify an interaction and the user associated with the interaction 118.

At 904, the system 100 may determine a plurality of textual features in each of the interactions. In an example, the natural language processing decoder 151 may use natural language processing as described hereinabove with reference to FIG. 1 to identify the plurality of textual features.

At 906, the natural language processing decoder 151 may determine a plurality of emotional features for each of the interactions based on the plurality of textual features and an emotions index. The emotions index as described with reference to FIG. 1A may associate textual features with an emotion.

At 908, the natural language processing decoder 151 may determine the emotional state 180 of the user that predominates in each interaction based on the plurality of emotional features 182. The natural language processing decoder 151 may use the approach set forth herein above to determine the emotional state 180 of the user.

At 910, the natural language processing decoder 151 may determine a chronological sequence of emotional states 181 for the user 112a based on the time of each of the interactions and the emotional states for each of the interactions.

At 912, the emotions model encoder 152 may determine the probability of transitioning between emotional states for the user 112a based on the chronological sequence of emotional states 181 for the user 112a. In an example, the emotions model encoder 152 may determine the probability of transitioning between no emotions to anger. The emotions model encoder may determine transitions between no emotion and another state, the number of no transitions. The emotions model encoder 152 may determine the probability of no transition, the probability of transition from no emotion to anger based on the transitions in the chronological sequence. In another example, the emotions model encoder 152 may use a transitions matrix to determine the probability of transitioning between the states.

At 914, the emotions model encoder 152 may then generate an emotions model 197 based on the probability of transitioning between different emotional states for the user.

At 9168, the artificial intelligence network and data security subsystem 153 may then determine an emotional stability value of the user based on the emotions model 197. In an example, as described above with respect to FIG. 1 the artificial intelligence network and data security subsystem 153 may determine the emotional stability value based on the entropy value. In another example, the artificial intelligence network and data security subsystem 153 may determine the emotional stability value 174 based on the transitions from one state to another and the count of transitions between one state to another and the count before the emotional state transitions.

Figure 10:
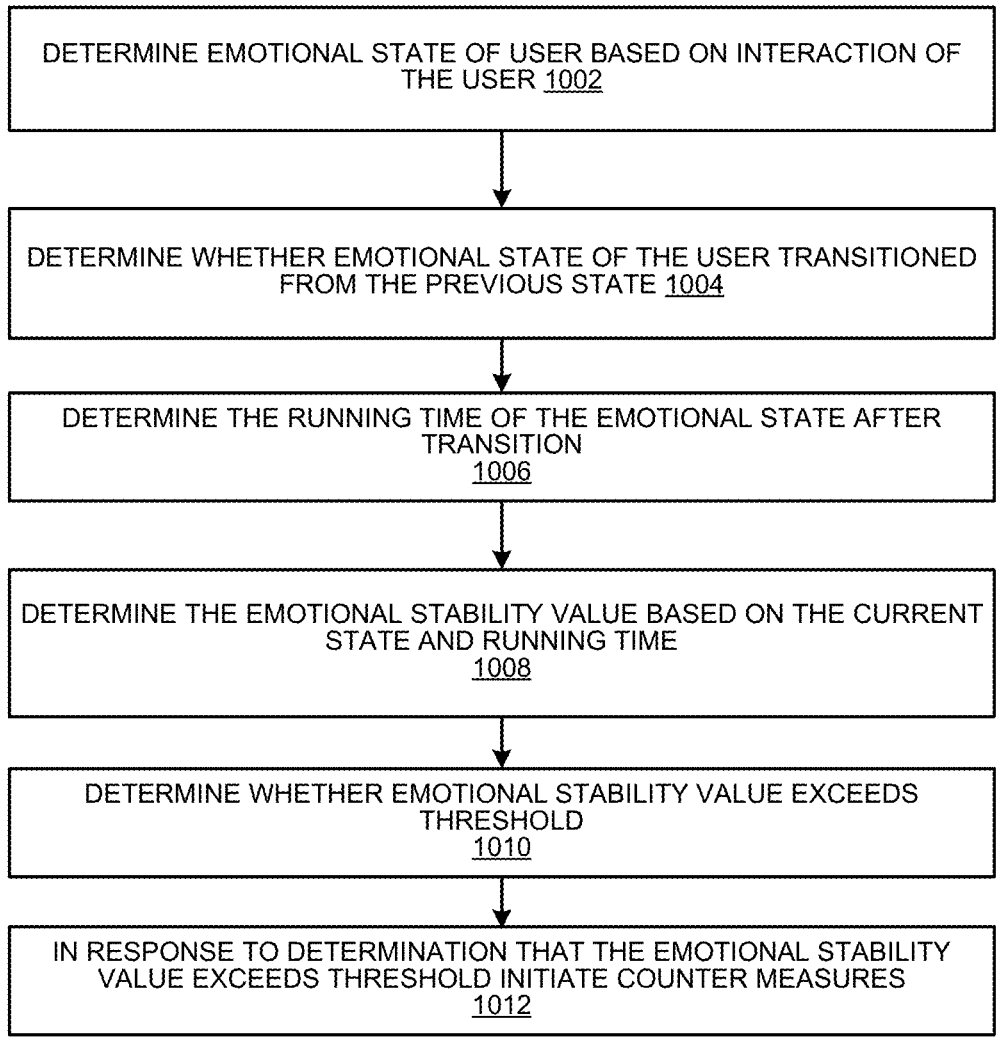
FIG. 10 illustrates a method of detecting anomalous behavior of the user based on an emotions model according to an embodiment.

FIG. 10 shows a method 1000 for detecting anomalous behavior of a user based on the emotions model 197 of the user.

At 1002, the artificial intelligence network and data security subsystem 153 may determine the emotional state of the user 112a based on the interactions for the user 112a. For example, the system 100 may monitor interactions of users 112 such as employees of an organization based on their interactions 118 such as emails.

At 1004, the artificial intelligence network and data security subsystem 153 may determine whether the emotional state 180 of the user transitioned from a previous state. For example, the artificial intelligence network and data security subsystem 153 may determine whether the current emotional state 180 in the interaction such as an email is different from the emotional state of the user 112a in the previous interaction.

At 1006, the artificial intelligence network and data security subsystem 153 may determine the running time of the emotional state after a transition for the user 112a. The artificial intelligence network and data security subsystem 153 may determine how long the user 112a has stayed in an emotional state based on the time of the last transition and the current emotional state of the user 112a.

At 1008, the artificial intelligence network and data security subsystem 153 may determine the emotional stability value 174 based on the current state and the running time. In another example, the emotional stability value 172 of the user 112a may be based on entropy of the emotions model 197. In an example, entropy rate of the emotions model 197 may be based on the time density of the emotional states in the chronological sequence of emotional states for the user 112a.

At 1010, the artificial intelligence network and data security subsystem 153 may determine whether the emotional stability value 174 of the user 112a exceeds a threshold. In an example, the artificial intelligence network and data security subsystem 153 may use the stability threshold 125 based on the past emotional stability value of the user. In another example, the artificial intelligence network and data security subsystem 153 may use a threshold based on the emotional stability value of other users.

At 1012, the system 100 may use artificial intelligence to take proactive measures, collect information from the sensors 147 etc., in response to a determination that the emotional stability value of the user 112a exceeds the threshold. In an example, the artificial intelligence network and data security subsystem 153 may initiate data protection measures as discussed above with reference to FIG. 1A.

While the embodiments have been described with reference to examples, those skilled in the art will be able to make various modifications to the described embodiments without departing from the scope of the claimed embodiments.

What is claimed is:
1. A natural language processing artificial intelligence network and data security system comprising:
   a processor;
   a non-transitory memory to store machine readable instructions;
   wherein the processor is to execute the machine readable instructions to:
      detect interactions of a user in a dataset using natural language processing, wherein the dataset comprises a plurality of interactions between a plurality of users on a network;
      determine a plurality of textual features expressed in natural language in each of the interactions;
      determine a plurality of emotional features for each of the interactions based on the plurality of textual features and an emotions index, wherein the emotions index associates textual features with emotional features;

determine an emotional state for each of the interactions based on an aggregation of the plurality of emotional features;

determine a chronological sequence of the emotional states for the user based on a time of each of the interactions and the determined emotional state for each of the interactions;

determine a probability of transitioning between different emotional states for the user based on the chronological sequence of emotional states for the user;

generate an emotions model as a primitive for artificial intelligence based on the probability of transitioning between different emotional states for the user;

determine an emotional stability value of the user based on the emotions model;

determine using an artificial intelligence subsystem whether the emotional stability value of the user is within a threshold, wherein the threshold is based on an emotional stability value of other users in the dataset; and in response to the determination that the emotional stability value is within the threshold, the artificial intelligence and data security subsystem regulates network permissions of the user.

2. The natural language processing artificial intelligence network and data security system of claim 1, wherein to determine the emotional stability value of the user the system is to:

determine transitions in the emotional state of the user in the chronological sequence of emotional states;

determine a count of interactions in the chronological sequence of emotional states between each of the transitions of emotional states; and generate the emotional stability value of the user based on the transitions and the count of interactions between each of the transitions.

3. The natural language processing artificial intelligence network and data security system of claim 1, wherein to determine the emotional stability value of the user the system is to:

generate the emotional stability value based on an entropy rate of the emotions model, wherein the entropy rate of the emotions model is based on a time density of the emotional states in the chronological sequence of emotional states for the user.

4. The natural language processing artificial intelligence network and data security system of claim 1, wherein to determine the emotional state for each of the interactions the system is to:

determine type counts of each of the emotional features in each of the interactions based on the determined plurality of emotional features, wherein the type count is a count of each of different types of emotional features in each of the interactions;

determine a dominant emotional feature in each of the interactions based on a highest type count in each of the interactions; and detect the emotional state for each of the interactions based on the dominant emotional feature.

5. The natural language processing artificial intelligence network and data security system of claim 1, wherein the emotions index comprises a types classification of emotional features and a plurality of textual features that maps to each of the types classification.

6. The natural language processing artificial intelligence network and data security system of claim 1, wherein the emotions index comprises:

a types classification of emotional features based on cognitive processes; and a plurality of textual features that maps to each of the types classification.

7. The natural language processing artificial intelligence network and data security system of claim 1, wherein the emotions index comprises:

a types classification of emotional features;

a hedonicity value associated with each of the emotional features; and a plurality of textual features that maps to each of the types classification.

8. The natural language processing artificial intelligence network and data security system of claim 1, wherein the emotions index comprises:

a types classification of emotional features, wherein the emotional features in the index are balanced using pairs of emotional features representing opposite emotions; and a plurality of textual features that maps to each of the types classification.

9. The natural language processing artificial intelligence network and data security system of claim 1, wherein each of the interactions detected for the user comprises a plurality of textual features expressed by the user per unit time.

10. The natural language processing artificial intelligence network and data security system of claim 1, wherein the processor is to execute the machine readable instructions to:

determine emotional stability values for other users in the dataset based on interactions for other users in the dataset; and determine a threshold for the emotional stability value based on the emotional stability values for other users in the dataset.

11. A natural language processing artificial intelligence network and data security system to regulate access to data for a user, the system comprising:

a data storage device to store a set of data, wherein the set of data comprises a plurality of interactions between a plurality of users;

at least one processor to:

detect interactions of users in a dataset, wherein the interactions are in natural language;

determine using natural language processing a plurality of textual features in each of the interactions for each of the users;

determine a plurality of emotional features for each of the interactions based on the textual features and an emotions index, wherein the emotions index associates textual features with emotional features;

determine an emotional state for each of the interactions based on an aggregation of the plurality of emotional features;

determine a chronological sequence of emotional states for each of the users based on a time for each of the interactions and the determined emotional state for each of the interactions;

determine a win-loss table of interactions between sub-sets of two users during the same period of time for each of the two users, based on the determined chronological sequence of emotional states for each of the users;

determine a relative ranking of interactions between sets of the two users based on the win-loss tables of interactions;

determine whether the relative ranking of a user in the users exceeds a ranking threshold, wherein the ranking threshold is based on a deviation from a mean ranking of users in the dataset; and based on the determination that the relative ranking of a user in the users exceeds the ranking threshold, the artificial intelligence network and data security subsystem modifies access to data on a data storage device for the user.

12. The natural language processing artificial intelligence network and data security system of claim 11, wherein to determine the emotional state for each of the interactions the system is to:

determine type counts of each of the emotional features in each of the interactions based on the determined plurality of emotional features, wherein the type count is a count of each of different types of emotional features in each of the interactions;

determine a dominant emotional feature in each of the interactions based on a highest type count in each of the interactions; and detect the emotional state for each of the interactions based on the dominant emotional feature.

13. The natural language processing artificial intelligence network and data security system of claim 11, wherein the emotions index comprises:

a types classification of emotional features based on cognitive processes; and a plurality of textual features that maps to each of the types classification.

14. The natural language processing artificial intelligence network and data security system of claim 11, wherein the emotions index comprises:

a types classification of emotional features;

a hedonicity value associated with each of the emotional features; and a plurality of textual features that maps to each of the types classification.

15. The natural language processing artificial intelligence network and data security system of claim 11, wherein the emotions index comprises:

a types classification of emotional features, wherein the emotional features in the index are balanced using pairs of emotional features representing opposite emotions; and a plurality of textual features that maps to each of the types classification.

16. An emotional anomaly detection and access regulation method comprising:

storing, in a storage device, a set of data, wherein the set of data comprises a plurality of interactions between a plurality of users;

determining, by at least one processor, an emotional anomaly detection based on the stored set of data, wherein detecting the emotional anomaly includes:

detecting interactions of users in a dataset;

determining a plurality of textual features in each of the interactions for each of the users;

determining a plurality of emotional features for each of the interactions based on the textual features and an emotions index, wherein the emotions index associates textual features with emotional features;

determining an emotional state for each of the interactions based on an aggregation of the plurality of emotional features;

determining a chronological sequence of emotional states for each of the users based on a time for each of the interactions and the determined emotional state for each of the interactions;

determining a probability of transitioning between different emotional states for each of the users based on the chronological sequence of emotional states for each of the users;

determining an emotions model based on the probability of transitioning between different emotional states for the each of the users;

determining an emotional stability value of each of the users based on the emotions model;

determining a win-loss table of interactions between sub-sets of two users during the same period of time for each of the users, based on the determined emotional stability value for each of the users;

determining a relative ranking of interactions between sets of two of the users based on the determined win-loss table of interactions;

determining whether the relative ranking of a user in the users exceeds a ranking threshold, wherein the ranking threshold is based on a deviation from a mean ranking of users in the dataset;

based on the determination that the relative ranking of a user in the users exceeds the ranking threshold, identify an emotional anomaly in the user interaction; and based on the determination that the relative ranking of the user in the users exceeds the ranking threshold, modifying access to data on a data storage device for the user.

17. The method of claim 16, wherein determining the emotional stability value of the user comprises:

determining transitions in the emotional states of each the users in the chronological sequence of emotional states;

determining a count of the interactions in the chronological sequence of emotional states between each of the transitions for each of the users; and generating the emotional stability value of each of the users based on the transitions and the count of interactions between each of the transitions.

18. The method of claim 16, wherein determining the emotional stability value of the users comprises:

generating the emotional stability value based on entropy rates of the emotions models for each of the users, wherein the entropy rate of each emotions model is based on a time density of the emotional states in the chronological sequence of emotional states for the user.

19. The method of claim 16, wherein the emotions index comprises:

a types classification of emotional features based on cognitive processes; and a plurality of textual features that maps to each of the types classification.

20. The method of claim 16, wherein the emotions index comprises:

a types classification of emotional features, wherein the emotional features in the index are balanced using pairs of emotional features representing opposite emotions; and a plurality of textual features that maps to each of the types classification.

* * * * *